US011480670B2

United States Patent
Kletsov et al.

(10) Patent No.: US 11,480,670 B2
(45) Date of Patent: Oct. 25, 2022

(54) TAG AND TAG POSITION DETERMINATION DEVICE AND METHOD

(71) Applicant: Samsung Electronics Co., Ltd., Suwon-si (KR)

(72) Inventors: Andrey Vladimirovich Kletsov, Moscow (RU); Alexander Gennadyevich Chernokalov, Moscow Region (RU); Stanislav Vladimirovich Polonsky, Moscow (RU); Artem Yurevich Nikishov, Moscow Region (RU); Dmitriy Sergeevich Zarshchikov, Moscow (RU)

(73) Assignee: Samsung Electronics Co., Ltd., Suwon-si (KR)

( * ) Notice: Subject to any disclaimer, the term of this patent is extended or adjusted under 35 U.S.C. 154(b) by 402 days.

(21) Appl. No.: 16/640,244

(22) PCT Filed: Sep. 7, 2018

(86) PCT No.: PCT/KR2018/010500
§ 371 (c)(1),
(2) Date: Feb. 19, 2020

(87) PCT Pub. No.: WO2019/054701
PCT Pub. Date: Mar. 21, 2019

(65) Prior Publication Data
US 2020/0393555 A1 Dec. 17, 2020

(30) Foreign Application Priority Data
Sep. 13, 2017 (RU) ............................ RU2017131997

(51) Int. Cl.
*G01S 13/87* (2006.01)
*H04W 4/33* (2018.01)
(Continued)

(52) U.S. Cl.
CPC .......... *G01S 13/878* (2013.01); *G01S 13/751* (2013.01); *G06K 7/10475* (2013.01);
(Continued)

(58) Field of Classification Search
CPC .......... G06K 19/0723; G06K 19/0709; G06K 7/0008; G06K 19/07749; G06K 19/0707;
(Continued)

(56) References Cited

U.S. PATENT DOCUMENTS 6,714,132 B2    3/2004  Edwards et al.
7,212,122 B2 *  5/2007  Gloekler ............ G08B 21/0269
                                                          340/572.1
(Continued)

FOREIGN PATENT DOCUMENTS

CN    105393127 B  *  9/2018  .......... G01R 31/371
EP    01724707 A2    11/2006
(Continued)

OTHER PUBLICATIONS

International Search Report and Written Opinion dated Dec. 21, 2018, issued in International Patent Application No. PCT/KR2018/010500.
(Continued)

*Primary Examiner* — Allahyar Kasraian
(74) *Attorney, Agent, or Firm* — Jefferson IP Law, LLP

(57) ABSTRACT

Provided are a tag and a method, performed by the tag, of transmitting a response signal regarding a tag search signal. The method includes: receiving, from at least one of a plurality of slave nodes, the tag search signal including identifying data for identifying the tag; charging an energy storage element inside the tag by using the received tag search signal; obtaining the identifying data for identifying the tag from the received tag search signal; determining whether the obtained identifying data matches identification
(Continued)

information pre-stored in the tag; and when the energy storage element is charged to a certain numerical value or above and the obtained identifying data matches the identification information pre-stored in the tag, outputting the response signal regarding the tag search signal.

15 Claims, 23 Drawing Sheets

(51) Int. Cl.
    *H04W 4/029*      (2018.01)
    *G01S 13/75*      (2006.01)
    *G06K 7/10*      (2006.01)
    *G06K 19/07*      (2006.01)
    *G06K 19/077*      (2006.01)
    *H04W 4/021*      (2018.01)

(52) U.S. Cl.
    CPC ... *G06K 19/0709* (2013.01); *G06K 19/07773* (2013.01); *H04W 4/021* (2013.01); *H04W 4/029* (2018.02); *H04W 4/33* (2018.02)

(58) Field of Classification Search
    CPC .......... G06K 19/07773; G06K 19/0704; G01S 13/878; G01S 13/758; H04W 4/80; H04W 4/029; H04W 4/02; H04W 4/021; H04W 4/33; H04W 4/38
    See application file for complete search history.

(56) References Cited

U.S. PATENT DOCUMENTS

| | | |
|---|---|---|
| 7,487,538 B2 | 2/2009 | Mok |
| 7,630,736 B2 | 12/2009 | Wang |
| RE41,471 E | 8/2010 | Wood, Jr. |
| RE41,530 E | 8/2010 | Wood, Jr. |
| 8,152,530 B2 | 4/2012 | Price et al. |
| 8,308,485 B2 | 11/2012 | Price et al. |
| 8,369,305 B2 | 2/2013 | Diener et al. |
| 8,558,672 B2 | 10/2013 | Zand |
| 8,665,088 B2 | 3/2014 | Rajapakse et al. |
| 8,866,673 B2 | 10/2014 | Mendelson |
| 9,110,897 B2 | 8/2015 | Park et al. |
| 9,338,606 B2 | 5/2016 | Moshfeghi |
| 9,436,858 B2 | 9/2016 | Liao |
| 9,491,237 B1 | 11/2016 | Garg et al. |
| 9,588,519 B2 | 3/2017 | Stubbs et al. |
| 2004/0110115 A1 | 6/2004 | Carvajal |
| 2004/0120297 A1 | 6/2004 | McDonnell et al. |
| 2004/0134984 A1 | 7/2004 | Powell et al. |
| 2004/0243281 A1 | 12/2004 | Fujita et al. |
| 2005/0029346 A1 | 2/2005 | Byrne et al. |
| 2005/0042586 A1 | 2/2005 | Carpenter et al. |
| 2006/0062363 A1 | 3/2006 | Albrett |
| 2006/0109109 A1 | 5/2006 | Rajapakse et al. |
| 2006/0261938 A1 | 11/2006 | Lai et al. |
| 2007/0090996 A1 | 4/2007 | Wang |
| 2008/0150698 A1 | 6/2008 | Smith et al. |
| 2009/0149202 A1 | 6/2009 | Hill et al. |
| 2009/0327333 A1 | 12/2009 | Diener et al. |
| 2010/0117823 A1 | 5/2010 | Wholtjen |
| 2011/0032081 A1 | 2/2011 | Wild |
| 2011/0311949 A1 | 12/2011 | Preston et al. |
| 2012/0183936 A1 | 7/2012 | Price et al. |
| 2012/0192617 A1 | 8/2012 | Walton et al. |
| 2012/0242481 A1 | 9/2012 | Gernandt et al. |
| 2012/0297541 A1 | 11/2012 | Brown |
| 2013/0029685 A1 | 1/2013 | Moshfeghi |
| 2013/0073387 A1 | 3/2013 | Heath |
| 2013/0088331 A1 | 4/2013 | Cho et al. |
| 2014/0125461 A1 | 5/2014 | Liao |
| 2014/0128032 A1 | 5/2014 | Muthukumar |
| 2014/0185487 A1 | 7/2014 | Cho et al. |
| 2015/0090786 A1 | 4/2015 | Surkau et al. |
| 2015/0123771 A1 | 5/2015 | Otto et al. |
| 2015/0293622 A1 | 10/2015 | Han et al. |
| 2015/0327328 A1 | 11/2015 | Novak et al. |
| 2016/0061957 A1 | 3/2016 | Li et al. |
| 2016/0212508 A1 | 7/2016 | Guglielmo et al. |
| 2017/0061404 A1 | 3/2017 | Tunnell et al. |
| 2017/0366232 A1 * | 12/2017 | Lee ............. H04B 5/0037 |
| 2018/0309314 A1 * | 10/2018 | White, II ............. H02J 50/12 |
| 2019/0156170 A1 * | 5/2019 | Zalbide Aguirrezabalaga ............ G06K 19/0704 |
| 2020/0058963 A1 * | 2/2020 | Morris ............. H02J 7/00 |

FOREIGN PATENT DOCUMENTS

| | | | |
|---|---|---|---|
| EP | 02341470 A1 | 7/2011 | |
| GB | 2543596 A * | 4/2017 | ......... G06K 7/10207 |
| KR | 10-0583401 B1 | 5/2006 | |
| KR | 10-2010-0038256 A | 4/2010 | |
| KR | 10-1105009 B1 | 1/2012 | |
| KR | 10-2014-0063404 A | 5/2014 | |
| KR | 10-2016-0135584 A | 11/2016 | |
| RU | 108 184 U1 | 9/2011 | |
| RU | 2 609 582 C1 | 2/2017 | |
| WO | 2007/106972 A1 | 9/2007 | |

OTHER PUBLICATIONS

Russian Search Report dated Apr. 5, 2018, issued in Russian Patent Application No. 2017131997.
Russian Decision to Grant dated Apr. 10, 2018, issued in Russian Patent Application No. 2017131997.
Extended European Search Report dated Aug. 13, 2020, issued in European Patent Application No. 18855505.6.
Louis Columbus, Internet Of Things Market To Reach $267B By 2020, Jan. 29, 2017, https://www.forbes.com/sites/louiscolumbus/2017/01/29/internet-of-things-market-to-reach-267b-by-2020/?sh=19dd3e84609b.

* cited by examiner

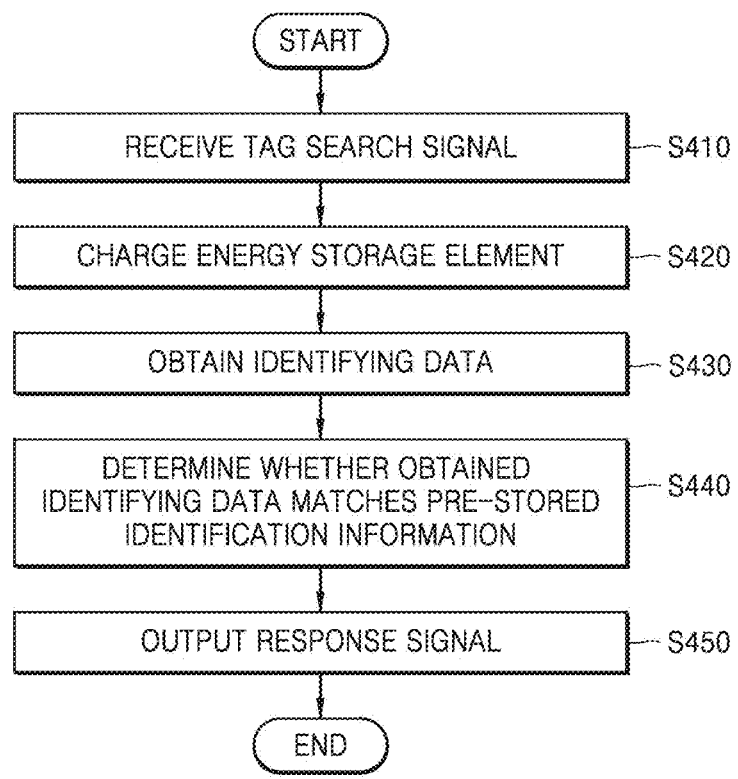

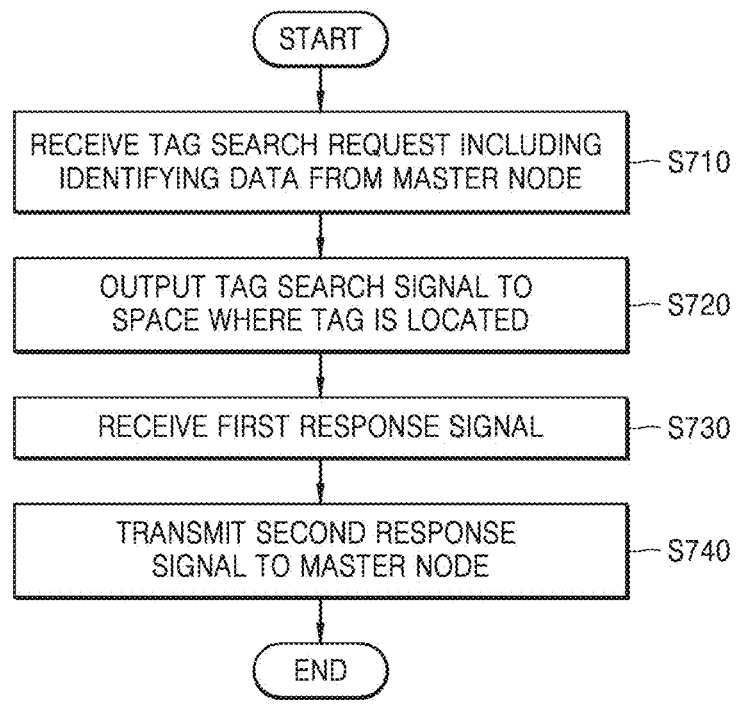

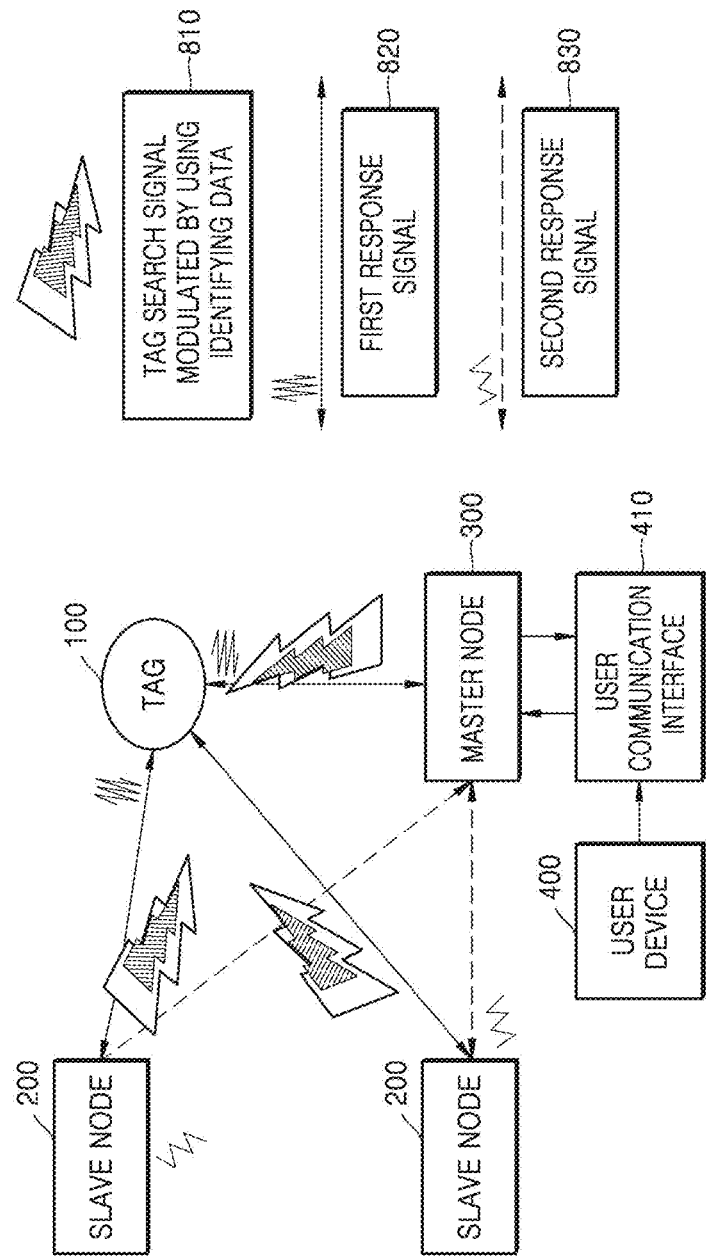

TAG AND TAG POSITION DETERMINATION DEVICE AND METHOD

TECHNICAL FIELD

The present disclosure relates to a location determining apparatus and method. More particularly, the present disclosure relates to an apparatus and method for determining a location of a tag by using a plurality of wireless devices.

BACKGROUND ART

In addition to a general satellite positioning system, there is a need to develop a technology for accurately determining a location of an object indoors or outdoors. Currently, various location determining technologies have been developed, and a system using a passive radio frequency (RF) identification (RFID) tag and an ultra wideband microwave signal is being most widely used.

Generally, the RFID tag having a size from 20 mm to 50 mm is operable without power at a low charging frequency, but location accuracy of the determined tag may be low. Also, in the case of a location determining system using an active tag including a power source therein, location accuracy of a determined tag may be relatively high, but because the power source is included in the tag, the size of the active tag itself is increased.

A general tag needs an uplink and a downlink for operation, and needs to include a receiver. In a general location determining system, because an active tag requires power to operate, a power source is included inside the tag and thus the size of the tag itself is increased. Furthermore, location accuracy of a tag determined by the general location determining system is low and because costs for generating the tag is high, it is difficult to secure the number of tags required to determine a location of the tag.

DESCRIPTION OF EMBODIMENTS

Technical Problem

According to embodiments, a tag and an apparatus and method for determining a location of the tag are provided. In particular, a tag using a radio frequency signal and an apparatus for determining a location of the tag are provided.

Solution to Problem

According to an embodiment of the present disclosure for achieving the above technical problem, a method, performed by a tag, of transmitting a response signal regarding a tag search signal, the method includes: receiving, from at least one of a plurality of slave nodes, the tag search signal including identifying data for identifying the tag; charging an energy storage element inside the tag by using the received tag search signal; obtaining the identifying data for identifying the tag from the received tag search signal; determining whether the obtained identifying data matches identification information pre-stored in the tag; and when the energy storage element is charged to a certain numerical value or above and the obtained identifying data matches the identification information pre-stored in the tag, outputting the response signal regarding the tag search signal. The tag search signal may be broadcasted from the plurality of slave nodes at a request of a master node.

According to another embodiment of the present disclosure for achieving the above technical problem, a tag for transmitting a response signal regarding a tag search signal, the tag includes: an antenna receiving, from at least one of a plurality of slave nodes, the tag search signal including identifying data for identifying the tag, and outputting a response signal; a harvester including an energy storage element and charging the energy storage element by using the received tag search signal; and a controller configured to obtain the identifying data from the received tag search signal, determine whether the obtained identifying data matches identification information pre-stored in the tag, and control the antenna to output the first response signal when the energy storage element is charged to a certain numerical value or above and the obtained identifying data matches the identification information pre-stored in the tag.

The tag search signal may be broadcasted from the plurality of slave nodes at a request of a master node. The first response signal may be output when the obtained identifying data matches the identification information pre-stored in the tag and the energy storage element is charged to the certain numerical value or above. The harvester may charge the energy storage element even when the identifying data obtained from the tag search signal does not match the identification information pre-stored in the tag.

According to another embodiment of the present disclosure for achieving the above technical problem, a location determining system includes: a master node to which a user device is connected; a plurality of slave nodes; and at least one tag including self identifying data.

The master node may be connected to the plurality of slave nodes wirelessly or via wires, the master node may be connected to the user device, and the master node and the plurality of slave nodes may each output a tag search signal modulated by using identifying data of a target tag in a space where at least one tag including self tag identification information is located.

The identifying data of the target tag may be received from the user device connected to the master node via a user communication interface, and transmitted to the plurality of slave nodes by the mater node.

Each of the at least one tag may receive the tag search signal modulated by using the identifying data and charge an energy storage element inside the tag by using the received tag search signal or power of an auxiliary charging device located within a surrounding environment where the tag is located.

Each of the at least one tag may obtain the identifying data of the tag from the tag search signal modulated by using the identifying data and, when the obtained identifying data matches identification information pre-stored in the tag, output a response signal.

Each of the master node and the plurality of slave nodes may receive a first response signal from the at least one tag, and each of the plurality of slave nodes may transmit (retranslate), to the master node, a second response signal generated by using the first response signal received from the at least one tag.

The master node may receive, from at least one of the plurality of slave nodes, the second response signal generated in the tag, and the master node may transmit, to the user device connected to the master node, the second response signal received from the plurality of slave nodes and the first response signal received from the tag.

The second response signal may include information about the first response signal or an arrival time of the first response signal, and the second response signal may be a signal in which the first response signal received by the plurality of slave nodes from the tag is retransmitted (re-translated) to the master node.

The user device may determine a location of the target tag in a space where the at least one tag is located, by using the received first response signal and second response signal, and provide the determined location of the target tag to a user.

The master node may determine a location of the target tag in a space where the at least one tag is located, by using the received first response signal and second response signal, and transmit the determined location of the target tag to the user device.

The master node may include a power source, a controller, a communicator, and a user communication interface. The communicator may include a response signal receiver, a tag search signal transmitter, and a tag search request transmitter, wherein the response signal receiver may include a first response signal receiver configured to receive the first response signal from the tag, and a second response signal receiver configured to receive the second response signal from the plurality of slave nodes.

The master node may further include an antenna, wherein the antenna may be connected to the response signal receiver, the tag search signal transmitter, the tag search request transmitter, the first response signal receiver, and the second response signal receiver included in the communicator. According to another embodiment of the present disclosure, the communicator, the response signal receiver, the tag search signal transmitter, the tag search request transmitter, the first response signal receiver, and the second response signal receiver may each further include an antenna.

The second response signal receiver may be connected to the controller, the response signal receiver, the first response signal receiver, and the second response signal receiver may be connected to the tag search signal transmitter, and the tag search signal transmitter may be connected to the controller. The controller may be further connected to the user communication interface.

The slave node may include a power source, a controller, and a communicator. The slave node may further include an antenna. The communicator may further include a first response signal receiver, a tag search request receiver, a tag search signal transmitter, and a second response signal transmitter. The antenna may be connected to the first response signal receiver, the tag search request receiver, the tag search signal transmitter, and the second response signal transmitter. The second response signal transmitter may be connected to the controller, the first response signal receiver may be connected to the tag search signal transmitter, and the tag search signal transmitter may be connected to the controller. The master node may be connected to the plurality of slave nodes via a wired or wireless link.

The tag may include a harvester, a response signal transmitter, an antenna, and a controller. The harvester may further include a rectifier, an energy storage element, and an identifying data obtainer. The rectifier may convert a radio frequency (RF) oscillation signal into a direct current (DC) signal, and charge the energy storage element by using energy of the DC signal.

The rectifier may be connected to the identifying data obtainer and the energy storage element. The identifying data obtainer may be connected to the controller or the data obtainer may not be provided separately from the controller but may be included in the controller.

The antenna may be connected to the rectifier and the response signal transmitter, the controller may be connected to the response signal transmitter, and the energy storage element may transmit energy to the controller and the response signal transmitter. According to an embodiment of the present disclosure, the energy storage element may include a capacitor.

A method of operating a location determining system, according to an embodiment, the method includes: receiving, by a master node, a tag search request for searching for at least one tag including identifying data, from a user device connected to the master node; transmitting, by the master node, a tag search request including the identifying data to a plurality of slave nodes connected to the master node; outputting, by the master node and at least two of the plurality of slave nodes, a tag search signal modulated by using the identifying data to a space where the at least one tag is located; and receiving, by the at least one tag, the tag search signal modulated by using the identifying data.

The receiving of the tag search signal modulated by using the identifying data may include: charging an energy storage element inside the tag by using the received tag search signal; obtaining the identifying data for identifying the tag from the received tag search signal; determining whether the obtained identifying data matches identification information pre-stored in the tag; and outputting a response signal regarding the tag search signal when the received identifying data matches the identification information pre-stored in the tag. The receiving of the tag search signal modulated by using the identifying data may further include, when it is determined that the identifying data matches the identification information, transmitting a locating pulse to the space.

The method of operating the location determining system may further include: receiving, by the master node and the plurality of slave nodes, a first response signal output by the tag in response to the tag search signal; generating, by the plurality of slave nodes, a second response signal by using the received first response signal and transmitting the generated second response signal to the master node; transmitting, by the master node, the received first response signal and the second response signal to a user device connected to the master node; determining, by the user device, a location of a tag that output the first response signal, by using the received first response signal and second response signal; and providing, by the user device, information about the determined location of the tag to a user.

The determining, by the user device, of the location of the tag may include: measuring a difference between arrival times of ultra wide bandwidth single pulses between all master node-slave node pairs; and calculating coordinates of the tag and a coordinate origin associated with the master node from a coordinate system connected to the master node, by using the measured difference between the arrival times of the ultra wide bandwidth single pulses. In order to improve location accuracy of the determined tag, the entire or a part of the method of operating the location determining system may be repeated.

Also, according to an embodiment of the present disclosure for achieving the above technical problem, there may be provided a computer-readable recording medium having recorded thereon a program for executing, on a computer, a method, performed by a tag, of transmitting a response signal regarding a tag search signal.

Advantageous Effects of Disclosure

A location of an object to which a tag is attached can be accurately determined by using the tag according to the present disclosure.

BRIEF DESCRIPTION OF DRAWINGS

FIG. 4 is a flowchart of a method, performed by a tag, of transmitting a response signal, according to an embodiment.

FIG. 7 is a flowchart of a method, performed by a slave node, of receiving a response signal, according to an embodiment.

FIG. 8 is a diagram schematically showing a method of determining a location of a tag in a location determining system.

BEST MODE

Figure 1:
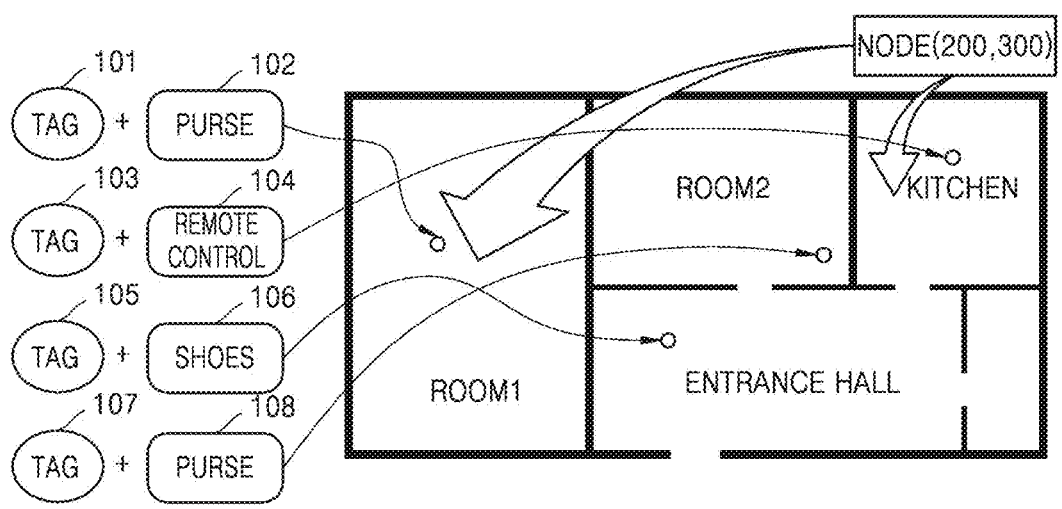
FIG. 1 is a diagram schematically showing a process in which a location determining system operates indoors, according to an embodiment.

Provided is a tag for transmitting a response signal regarding a tag search signal, the tag including: an antenna receiving, from at least one of a plurality of slave nodes, the tag search signal including identifying data for identifying the tag, and outputting the response signal; a harvester including an energy storage element and charging the energy storage element by using the received tag search signal; and a controller configured to obtain the identifying data from the received tag search signal, determine whether the obtained identifying data matches identification information pre-stored in the tag, and control the antenna to output the response signal when the energy storage element is charged to a certain numerical value or above and the obtained identifying data matches the identification information pre-stored in the tag, wherein the tag search signal is broadcast from the plurality of slave nodes at a request of a master node.

Provided is a method, performed by a tag including an energy storage element, of transmitting a response signal regarding a tag search signal, the method including: receiving, from at least one of a plurality of slave nodes, the tag search signal including identifying data for identifying the tag; charging the energy storage element inside the tag by using the received tag search signal; obtaining the identifying data for identifying the tag from the received tag search signal; determining whether the obtained identifying data matches identification information pre-stored in the tag; and when the energy storage element is charged to a certain numerical value or above and the obtained identifying data matches the identification information pre-stored in the tag, outputting the response signal regarding the tag search signal, wherein the tag search signal is broadcast from the plurality of slave nodes at a request of a master node.

Provided is a computer-readable recording medium having recorded thereon a program for executing, on a computer, a method, performed by a tag, of transmitting a response signal regarding a tag search signal.

MODE OF DISCLOSURE

The terms used in the specification will be briefly defined, and the present disclosure will be described in detail.

The terms used in the present disclosure are selected from general terms currently widely used in consideration of functions in the present disclosure, but the terms may vary according to the intention of one of ordinary skill in the art, precedent cases, or the appearance of new technologies. Also, some terms may be arbitrarily selected by the applicant, and in this case, the meaning of the selected terms will be described in detail in the detailed description of the disclosure. Thus, the terms used herein have to be defined based on the meaning of the terms together with the description throughout the specification.

When a part "includes" or "comprises" an element, unless there is a particular description contrary thereto, the part may further include other elements, not excluding the other elements. In the following description, terms such as "unit" and "module" indicate a unit for processing at least one function or operation, wherein the unit and the block may be embodied as hardware or software or embodied by combining hardware and software.

Hereinafter, embodiments of the present disclosure will be described in detail with reference to the accompanying drawings such that one of ordinary skill in the art may easily implement the embodiments of the disclosure. However, the present disclosure may be implemented in many different forms and are not limited to those described herein. Also, in the drawings, elements not related to the description are omitted to clearly describe the present disclosure, and like reference numerals denote like or like elements throughout the specification.

According to the present disclosure, a tag of the present disclosure solves a problem of a general passive radio frequency identification (RFID) tag, and does not require a separate power source, is inexpensive, and may provide high accuracy of a tag location like an active RFID tag. In particular, unlike a general location determining system, a location determining system according to the present disclosure is able to invoke only a desired tag (for example, a target tag), ignore another tag, and simultaneously charge tags from an arbitrary electromagnetic source of a certain industrial, scientific and medical (ISM) bandwidth.

According to the present disclosure, a small and low power RFID tag may be provided. Also, according to the present disclosure, a low power communication means for transmitting data between an RFID tag and a reader, and a relatively high power narrowband means for remotely charging an RFID tag may be provided.

According to the present disclosure, an RF location determining system for solving a problem of low accuracy of an RFID tag location in a complex communication environment in which location information of a tag is provided to a mobile device using a fixed active RFID tag may be provided. Determined location information of a tag may be directly transmitted to a reader at the center of a location designation region at a long distance. The present disclosure uses a long distance coordinator and time information in a transmission instruction for adjusting and scheduling communication time between a mobile tag and a location designated tag.

FIG. 1 is a diagram schematically showing a process in which a location determining system operates indoors, according to an embodiment.

According to an embodiment, the location determining system enables a user to easily find an object located indoors. To find an object inside a house, the user may attach a small flexible tag including identifying data for identifying a tag to a target object. According to an embodiment of the present disclosure, the user may attach the tag to the target object to use the location determining system, and register the identifying data of the tag attached to the target object in a user device.

According to an embodiment, the identifying data of the tag may include tag identification information, registration confirmation information related to whether the tag is registered in the user device, and network identification information including a master node, a slave node, and a tag. The user may receive information about a location of the tag determined from the location determining system, and determine a location of the target object by using the received information about the location of the tag. According to an embodiment, a tag and information about an object to which the tag is attached may be matched, and the matched tag and information about the object to which the tag is attached may be stored, in a form of a table, in the user device or a network connected to the user device, but an embodiment is not limited thereto.

Referring to FIG. 1, the user may pre-attach tags to a purse 102, a remote controller 104, shoes 106, and a toy 108 so as to determine locations of objects located in the house by using the location determining system. The user may determine the locations of the objects to which the tags are attached by using communication between a plurality of nodes inside a space where the tags are located. According to an embodiment of the present disclosure, the nodes include a slave node 200 and a master node 300, wherein the slave node 200 and the master node 300 may be a coordinator or an access point based on a type of a network. According to an embodiment, the master node 300 may be a mobile terminal (for example, a smart phone or a personal digital assistance (PDA)) and may access the Internet or a cellular network.

The user may apply the location determining system to various user applications. For example, the location determining system according to the present disclosure may be used in applications for finding a lost object, detecting rapid movement of an object, tracking a location of a person having an object to which a tag is attached (for example, tracking a location of an elderly), and educating children.

Also, a tag according to an embodiment of the present disclosure does not require battery replacement, is small, and has low manufacturing costs, and thus the user may easily use the required number of tags. Also, the tag according to an embodiment of the present disclosure has low power consumption and has high location accuracy of a determined tag. According to an embodiment, the user device using a first response signal received from the tag of the present disclosure may determine the location of the object to which the tag is attached within a 10 cm error.

According to an embodiment, a tag search signal, a first response signal, and a second response signal transmitted and received between a tag, a master node, and a slave node may be wireless signals having an ultra wideband/narrowband frequency characteristic. Also, the tag search signal, the first response signal, and the second response signal may be single pulse signals. According to an embodiment, the tag search signal, the first response signal, and the second response signal may be ultra wide bandwidth single pulse signals.

In the location determining system according to the present disclosure, a first response signal receiver and a second response signal receiver included in a master node or a slave node may be envelope detectors having a bandwidth wider than 1/T (T: pulse duration). A link between the master node and the slave node according to the present disclosure may denote communication using only wireless signals of single pulses for determining a location of a tag.

The location determining system according to the present disclosure may include a tag, a master node, a plurality of slave nodes, and a user device, and an apparatus for determining a location of the tag may include a master node, a plurality of slave nodes, and a user device. The tag according to the present disclosure does not require a separate power source, has a small size, and may simultaneously use a plurality of tags.

The master node or the plurality of slave nodes described in the present specification may be a coordinator, a router, or an access point based on a type of a network. Also, the master node according to the present disclosure may be connected to the user device via a user communication interface or connected to the Internet or a cellular network via the user device.

Figure 2:
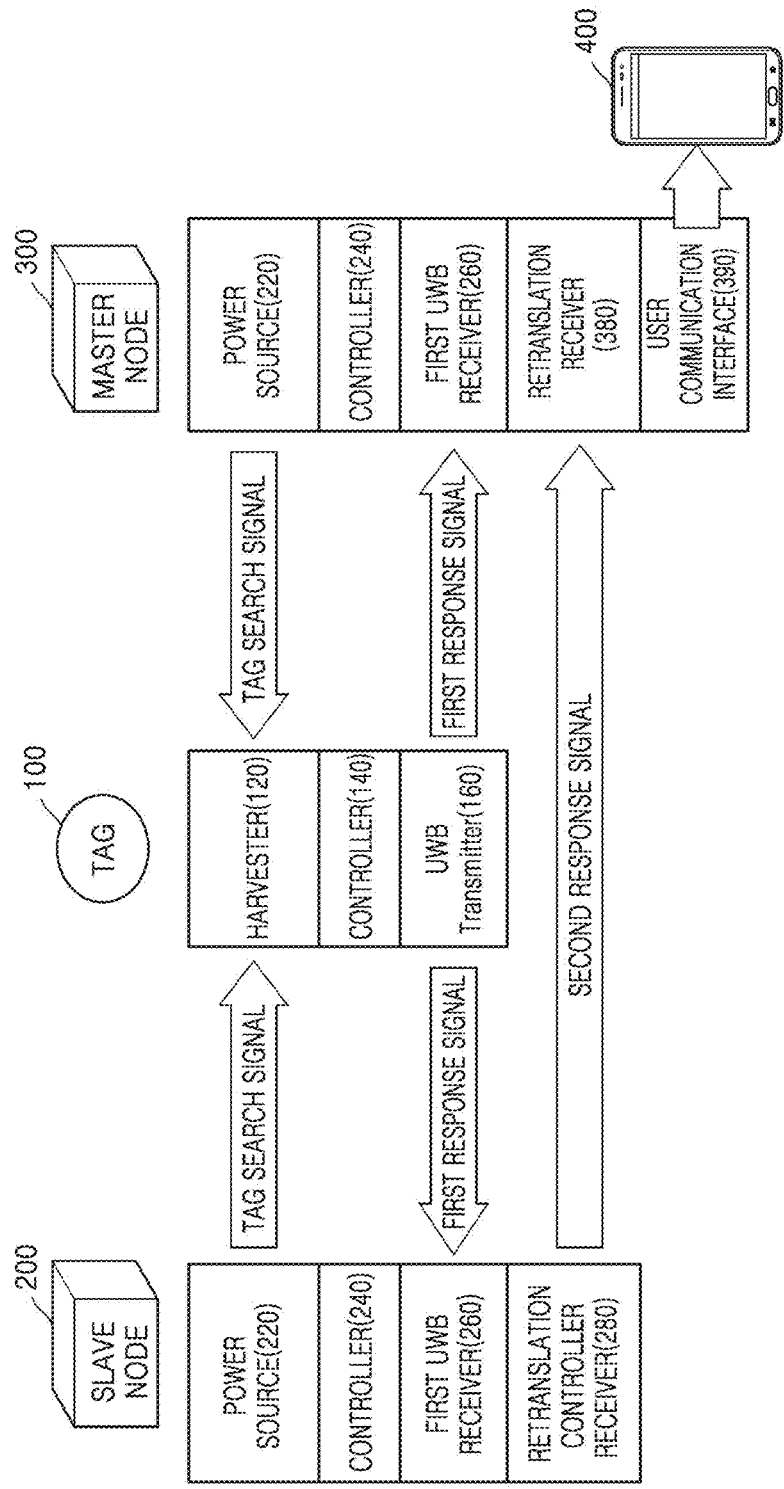
FIG. 2 is a diagram schematically showing an operating process of a location determining system, according to an embodiment.

FIG. 2 is a diagram schematically showing an operating process of a location determining system, according to an embodiment.

The location determining system may include the master node 300 connected to a user device via a user communication interface, the plurality of slave nodes 200 spatially separated from the master node and connected to the master node via wires or wirelessly, at least one tag 100 including self identifying data, and a user device 400. For example, the master node may transmit a tag search request for searching for a tag to the slave nodes, and the slave node may broadcast the tag search signal to a space where the tag is located at the request of the master node.

According to an embodiment, the tag 100 may include a harvester 120, a controller 140, and a response signal transmitter 160. For example, a first response signal output by the tag 100 in response to the tag search signal may be an ultra wideband (UWB) signal, and thus the response signal transmitter may be a UWB transmitter.

According to an embodiment, the slave node 200 may include a power source 220, a controller 240, a first response signal receiver 260, and a second response signal transmitter 280. For example, the first response signal received by the slave node 200 may be a UWB signal, and thus the first response signal receiver 260 may be a UWB receiver. According to an embodiment, the second response signal transmitter 280 may be a retranslation transmitter or a repeater.

According to an embodiment, the master node 300 may include a power source 320, a controller 340, a first response signal receiver 360, a second response signal receiver 380, and a user communication interface 390. As described above, a tag search signal, a first response signal, and a second response signal may be UWB signals, and the first response signal receiver 360 may include a UWB receiver and the second response signal receiver 380 may include a retranslation receiver.

For example, the slave node 200 and the master node 300 may each include a power source and output a tag search signal to a space where a tag is located by using power supplied from the power source.

The harvester in the tag 100 according to the present disclosure may charge an energy storage element in the tag by using the received tag search signal, and the controller 140 in the tag 100 may obtain identifying data from the received tag search signal and compare the obtained identifying data and identification information pre-stored in the tag. In other words, the tag search signal according to the present disclosure is a charging signal, and may function as a charging signal modulated by the identifying data and at the same time, as a signal including the identifying data for tag searching.

The controller 140 in the tag may control the response signal transmitter 160 to output the first response signal when the energy storage element is charged to a certain numerical value or above and the obtained identifying data matches the identification information pre-stored in the tag. The slave node 200 and the master node 300 according to the present disclosure may receive the first response signal from the tag 100, and the slave node 200 may transmit, to the master node 300, a second response signal generated by using the received first response signal. According to an embodiment, the second response signal may include information about an arrival time of the first response signal, and is a signal for retransmitting (retranslating) the first response signal received by the slave node 200 from the tag 100 to the master node 300 and thus may have the same frequency characteristic as the first response signal.

The master node 300 according to the present disclosure may receive the first response signal from the tag 100, receive the second response signal from the slave node 200, and transmit the received first response signal and second response signal to the user device 400 through the user communication interface 390.

Figure 3A:
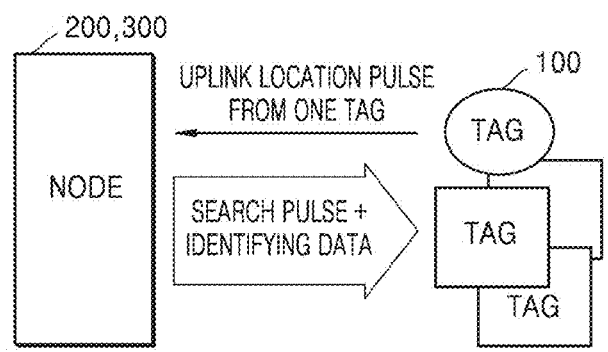
FIGS. 3A and 3B are diagrams showing a difference between a general location determining system and a location determining system according to the present disclosure.
Figure 3B:
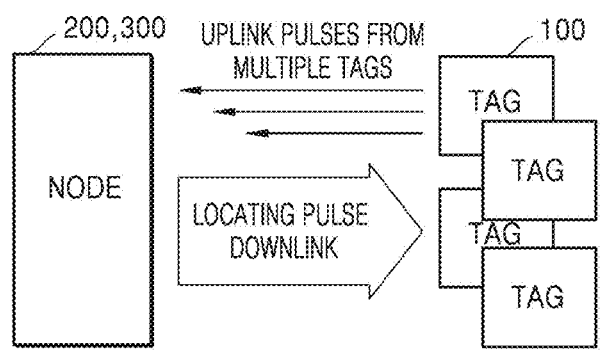

FIGS. 3A and 3B are diagrams showing a difference between a general location determining system and a location determining system according to the present disclosure.

FIG. 3A is a diagram schematically showing communication performed between a tag and a node in a location determining system according to the present disclosure.

The tag 100 according to the present disclosure includes a single response signal transmitter (for example, a UWB transmitter) for transmitting a response signal in a form of a single pulse, and may output a response signal to a space where the plurality of slave nodes 200 and the master node 300 are located. A tag according to the present disclosure may receive a tag search signal modulated by using identifying data, and charge an energy storage element in the tag by using the received tag search signal while performing a tag authentication process by using the identifying data included in the received tag search signal.

For example, unlike a general tag, the tag 100 according to the present disclosure does not include a separate receiver, does not require a downlink between nodes, and charges energy by using a tag search signal modulated by using identifying data while authenticating whether the tag search signal is a signal for invoking itself. Accordingly, because a tag according to the present disclosure does not include a power source (battery) and a receiver therein, the tag may be miniaturized.

When obtained identifying data matches tag identification information pre-stored in a tag according to the present disclosure, the tag may output a response signal via an unlink formed between a plurality of slave nodes and a master node, by using an antenna in the tag. According to an embodiment, when the obtained identifying data matches the tag identification information pre-stored in the tag and an energy storage element in the tag is charged to a certain numerical value or above, the tag may output a response signal. Accordingly, a tag according to the present disclosure may not immediately output a response signal even when a tag search signal modulated by using identifying data matching its identification information is received.

According to an embodiment, the tag according to the present disclosure may have a very low current consumption (for example, about 200 Ua) by a response signal transmitter at a voltage of about 3 V, and a master node and a slave node connected to each other via a wired or wireless link may transmit, to the tag, power of up to 10 W allowed in the ISM wireless standard. Also, a rate at which a tag according to the present disclosure is charged may be 1 to 10 ms, but is not limited thereto. Also, the rate at which the tag is charged may vary according to a distance from a master node or a slave node.

FIG. 3B is a diagram schematically showing communication performed between a tag and a node in a general location determining system.

Unlike the tag 100 according to the present disclosure, a general tag includes a separate receiver, and a node transmits, to the tag, a tag search signal or a signal including information about a tag invoking command via a separate downlink. However, as shown in FIG. 3A, the location determining system using the tag 100 according to the present disclosure does not require a downlink with a node, charges energy by using a tag search signal modulated by using identifying data while authenticating whether the tag search signal is a signal for invoking itself, and immediately outputs a response signal via an unlink A harvester of a tag according to the present disclosure may receive energy and data and does not require an immediate response, and a single response signal transmitter (for example, a UWB transmitter) in the tag may output a response signal to all nodes via an unlink.

FIG. 4 is a flowchart of a method, performed by a tag, of transmitting a response signal, according to an embodiment.

In operation S410, the tag 100 may receive a tag search signal from the master node 300 and the plurality of slave nodes 200 connected to the master node. For example, the tag search signal received by the tag 100 is a UWB single pulse signal, and may be modulated in units of pulses by using identifying data for identifying the tag. Also, in the present disclosure, the tag search signal may be an alternate current (AC) signal oscillating for a certain period.

In operation S420, the tag 100 may charge an energy storage element in the tag 100 by using the received tag search signal. For example, the tag 100 may convert the received tag search signal into direct current (DC) energy, and charge the energy storage element with the DC energy. According to an embodiment of the present disclosure, the energy storage element may include at least one capacitor. The energy storage element according to the present disclosure may provide power to at least one of a controller, an antenna, and a response signal transmitter in the tag.

In operation S430, the tag 100 may obtain the identifying data from the received tag search signal. For example, the tag search signal received by the tag 100 from the master node and/or the slave node may be a signal binary-modulated by using the identifying data. The tag 100 may receive the tag search signal binary-modulated by using the identifying data, demodulate the received tag search signal, and obtain the identifying data from the demodulated tag search signal.

According to an embodiment, the tag search signal according to the present disclosure may be modulated in units of packets by using the identifying data. The number of tags identifiable by the slave node 200 and the master node 300 according to the present disclosure may vary according to a packet length in the tag search signal received by being modulated in units of packets.

In operation S440, the tag 100 may determine whether the obtained identifying data matches identification information of the tag pre-stored in the tag. For example, the tags 100 according to the present disclosure may pre-store identification information for identifying each of the tags. The tag 100 may compare the identifying data included in the tag search signal and obtained from the tag search signal output from the master node and/or the slave node with the identification information pre-stored in the tag to perform a tag authentication process of authenticating whether the received tag search signal invokes itself.

In operation S450, the tag 100 may output a response signal when the obtained identifying data matches the identification information pre-stored in the tag. For example, the tag 100 may output the response signal when the obtained identifying data matches the identification information pre-stored in the tag and the energy storage element in the tag is charged to a certain numerical value or above. However, according to an embodiment, the tag according to the present disclosure may charge the energy storage element in the tag by using the received tag search signal even when the tag search signal including the identifying data not matching the identification information pre-stored in the tag is received. The response signal according to the present disclosure may be provided as a UWB single pulse for low power consumption. Also, the response signal according to the present disclosure may be a beacon signal used for location determination.

Figure 5:
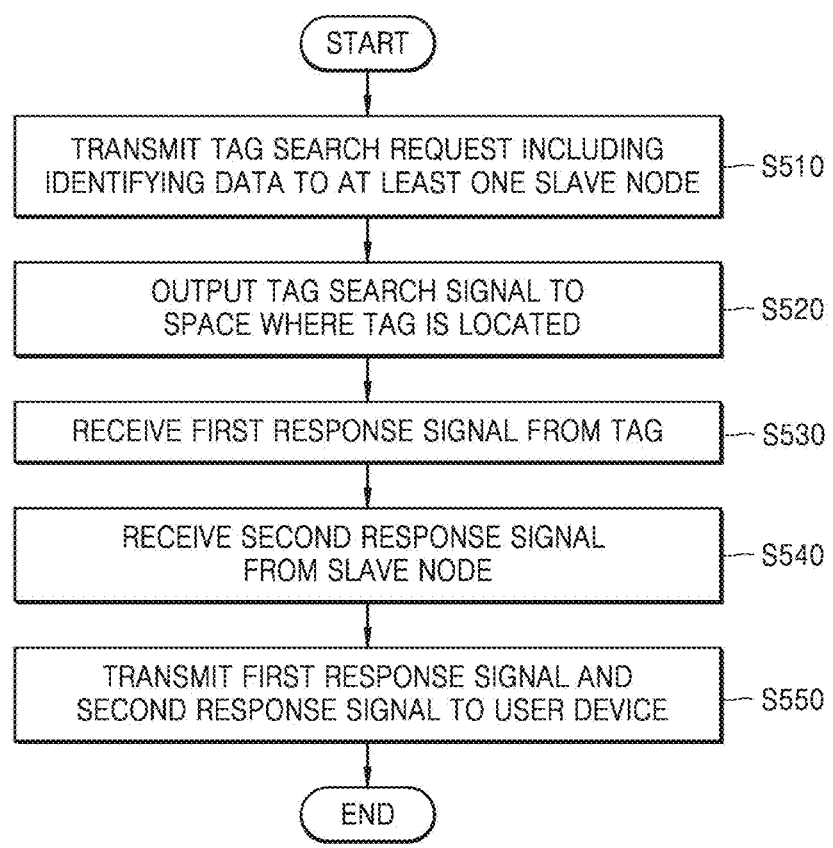
FIG. 5 is a flowchart of a method, performed by a master node, of receiving a response signal, according to an embodiment.

FIG. 5 is a flowchart of a method, performed by a master node, of receiving a response signal, according to an embodiment.

In operation S510, the master node 300 may transmit a tag search request including identifying data for identifying a tag to a slave node. For example, the master node 300 may be connected to a user device via a user communication interface and receive the identifying data for identifying a tag from the user device. The master node 300 may transmit the identifying data received from the user device to the slave node. The identifying data according to the present disclosure includes all types of information for intrinsically identifying the tag of which a location is to be determined by a user. Also, the master node 300 may separately include a power source (for example, an auxiliary RF power source) therein to receive power from the power source.

In operation S520, the master node 300 may output a tag search signal to a space where the tag is located. According to an embodiment, the master node 300 may output the tag search signal to the space where the tag is located by broadcasting the tag search signal to the space where the tag is located. For example, the master node 300 may output the tag search signal together with the slave node 200 or output the tag search signal separately from the slave node 200 with a certain time difference. The tag search signal output from the master node 300 and the tag search signal output from the slave node 200 may be synchronized, but synchronization is not necessarily required.

According to an embodiment, the master node 300 may modulate the tag search signal by using the identifying data and output the tag search signal modulated by using the identifying data to the space where at least one tag is located. The tag search signal output from the master node 300 or slave node 200 according to the present disclosure may be modulated in units of packets by using the identifying data.

In operation S530, the master node 300 may receive a first response signal from the tag 100. In operation S540, the master node 300 may receive a second response signal from the slave node 200. For example, in the present specification, a first response signal may denote an RF signal transmitted from a tag to a master node or a slave node, and a second response signal may denote an RF signal in which the first response signal received by the slave node is retransmitted from the slave node to the master node.

According to an embodiment, the second response signal may include information about an arrival time of the first response signal between the tag and the plurality of slave nodes.

In operation S550, the master node 300 may transmit the received first response signal and second response signal to the user device. For example, the master node 300 may transmit, to the user device, the received first response signal and second response signal via the user communication interface. According to an embodiment, when the master node 300 self-determines a location of the tag by using the first and second response signals, the master node 300 may not transmit the received first and second response signals to another wireless device connected to the master node 300.

Figure 6A:
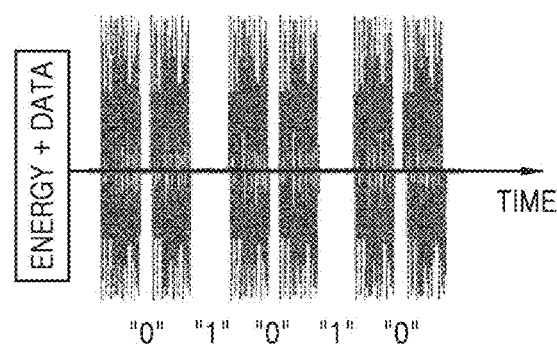
FIGS. 6A and 6B are diagrams for describing a tag search signal modulated by using identifying data and processes of charging energy by using a tag search signal through which a tag is received and transmitting a first response signal by using the charged energy.
Figure 6B:
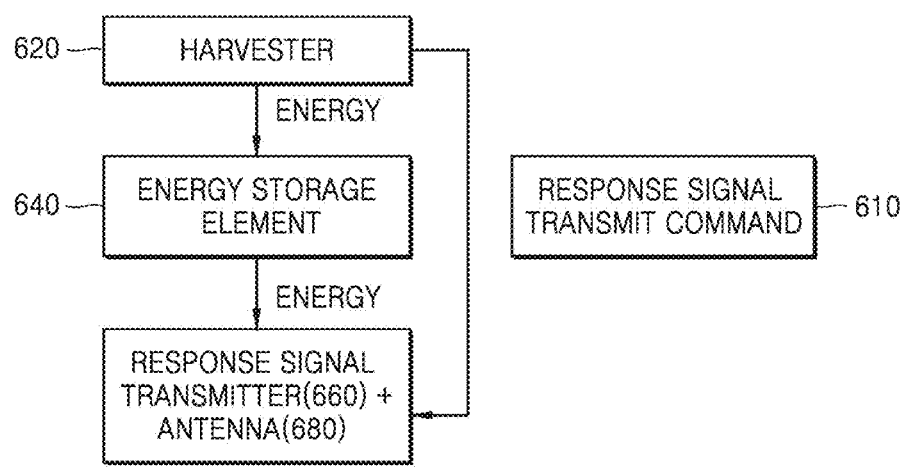

FIGS. 6A and 6B are diagrams for describing a tag search signal modulated by using identifying data and processes of charging energy by using a tag search signal through which a tag is received and transmitting a first response signal by using the charged energy.

FIG. 6A is a diagram for describing a process, performed by a master node and a slave node, of modulating a tag search signal by using identifying data.

The slave node 200 and the master node 300 according to the present disclosure may modulate a tag search signal by using identifying data received from a user. Referring to FIG. 6A, the tag search signal represented in a form of a pulse type is modulated by using binary identifying data including 0 and 1, along a time axis. The tag search signal modulated by using the binary identifying data may be expressed in different amplitudes, frequencies, or cycles, based on the identifying data.

For example, the identifying data used by the slave node 200 and master node 300 according to the present disclosure may include at least one of tag identification information stored in a tag, registration confirmation information indicating whether the tag is stored in a user device, identification information of a network (network ID) including the master node, the at least one slave node, and the tag, and an identification range of identification of the tag or network (desired ID range).

The tag search signal according to the present disclosure may be modulated at a data transmission rate within 1 to 10 Kbps. Also, the tag search signal may be modulated at 0.99 duty cycle without significant loss of charging speed due to data transmission. The tag search signal modulated by using the identifying data according to the present disclosure may be modulated in units of packets, and to guarantee stable reception of data, the tag search signal modulated in units of packets may be repeatedly transmitted at certain cycles.

Also, the repeatedly transmitted packet may have the length of about 32 bytes, and about 2^48 tags may be identified for each node, based on the length of the packet. According to an embodiment, each of a slave node and a master node of the present disclosure may modulate a tag search signal by using identifying data, transmit the tag search signal modulated in units of packets, and simultaneously support (serve) different numbers of multi-tags according to the length of binary-modulated data packet. Because a tag search signal according to the present disclosure may be modulated by using identifying data, location protocols for a plurality of tags may be differently set.

FIG. 6B is a diagram showing processes, performed by a tag, of charging an energy storage element by using a received tag search signal and outputting a response signal by using energy of the charged energy storage element.

A harvester 620 in the tag 100 according to the present disclosure may charge an energy storage element 640 by using a received tag search signal. For example, the harvester 620 may convert the received tag search signal into DC energy by using a rectifier included in the harvester 620. The harvester 620 may provide the DC energy to the energy storage element 640 and charge a capacitor in the energy storage element 640 by using the provided DC energy. The harvester 620 according to the present disclosure may output a response signal through an antenna 680 by using the energy stored in the energy storage element 640 when identifying data obtained from the received tag search signal matches identification information pre-stored in the tag and the energy storage element 640 is charged to a certain numerical value or above.

FIG. 7 is a flowchart of a method, performed by a slave node, of receiving a response signal, according to an embodiment.

In operation S710, the slave node 200 may receive, from the master node 300 connected to the slave node, a tag search request including identifying data for identifying a tag. For example, the slave node 200 may be connected to the master node via a wired or wireless link, and receive the tag search request from the master node 300 via the wired or wireless link. The slave node 200 may receive power from a power source in the slave node and output a tag search signal by using the received power.

In operation S720, the slave node 200 may output the tag search signal modulated by using the identifying data to a space where the tag is located. In the present specification, the slave node 200 or the master node 300 may output the tag search signal to the space where the tag is located by broadcasting the tag search signal. For example, the slave node 200 may modulate the tag search signal by using the identifying data received from the master node and output the modulated tag search signal to the space where at least one tag is located. The slave node 200 may modulate the tag search signal in units of packets, by using the identifying data.

In operation S730, the slave node 200 may receive a first response signal from the tag responding to the output tag search signal. According to an embodiment, the tag search signal transmitted by the slave node 200 and the first response signal received by the slave node 200 from the tag 100 may be microwaves of UWB. Also, according to an embodiment, a frequency band of the tag search signal may be different from frequency bands of the first response signal and a second response signal.

In operation S740, the slave node 200 may generate the second response signal indicating a location of the tag by using the first response signal, and transmit the generated second response signal to the master node 300. According to an embodiment, the slave node 200 may transmit the second response signal generated by using the first response signal to the master node 300 by transmitting the first response signal received from the tag 100 to the master node. The second response signal may include information about an arrival time of the first response signal between the tag and the slave node.

FIG. 8 is a diagram schematically showing a method of determining a location of a tag in a location determining system.

The location determining system according to the present disclosure may include the tag 100, the slave node 200, and the master node 300. A method, performed by the location determining system according to an embodiment, of determining a location of a tag will be described.

According to an embodiment, the master node 300 may receive identifying data from a user via a user communication interface 410 and transmit tag search request including the received identifying data to the plurality of slave nodes 200. The plurality of slave nodes 200 and the master node 300 may modulate the tag search signal by using the identifying data and output the modulated tag search signal to a space where the tag 100 is located.

The tag 100 according to the present disclosure may receive the tag search signal from the slave node 200 and the master node 300 located within a certain threshold distance, and output a first response signal in response to the received tag search signal. When the plurality of slave nodes 200 according to the present disclosure receive the first response signal from the tag 100, the slave nodes may retransmit the first response signal to the master node 300. According to an embodiment, the slave node 200 retransmits the first response signal received from the tag 100 to the master node 300 by generating a second response signal by using the first response signal received from the tag 100 and transmitting the generated second response signal to the master node 300. The slave node 200 according to the present disclosure may further include a retranslation transmitter for retransmitting the first response signal received from the tag 100 to the master node.

The master node 300 according to the present disclosure may measure arrival times of the first response signals from the tag 100 to the master node 300 or the plurality of slave nodes 200. The first response signals according to the present disclosure may include all of a signal received by the master node 300 from the tag 100 and signals received by the slave node 200 from the tag 100. Also, the master node 300 according to the present disclosure may measure arrival times of the second response signals transmitted from the plurality of slave nodes 200 to the master node 300. The master node 300 may determine locations of tags by using measured arrival times of the first response signals and second response signals.

According to an embodiment, regarding the determining, by the master node 300, of the locations of the tags by using the arrival times of the first response signals and second response signals, the slave nodes 200 may be merged with each other to reduce the number of tags mounted per node. Accordingly, the master node 300 may measure the arrival times of the first response signals and second response signals on the basis of the merged slave nodes 200, and determine the locations of the tags by using the measured arrival times of the first response signals and the second response signals.

For example, the master node 300 may calculate a time difference between the arrival time of the first response signal and the arrival time of the second response signal and determine the location of the tag 100 by using the calculated time difference. The master node 300 may calculate differences between an arrival time of the first response signal directly received from the tag 100, arrival times of the first response signal received by the plurality of slave nodes 200 from the tag 100, and an arrival time of the second response signal retransmitted from the slave node 200. A method, performed by a master node, a user device, and a location determining system, of determining a location of a tag by using an arrival time of a first response signal and an arrival time of a second response signal, according to the present disclosure, may include a general time difference of arrival (TDOA) method. A specific calculation process of determining a location of a tag by using a time difference between an arrival time of a first response signal and an arrival time of a second response signal will be described in detail with reference to FIG. 9.

According to an embodiment, the master node 300 according to the present disclosure may calculate Cartesian coordinates of a tag in a space, based on locations of nodes, by using a difference between arrival times, determine a node closest to the tag, and repeatedly transmit a tag search request for determining a location of the tag of the determined closest node. Because a tag search request described in the present specification may include identifying data for identifying a certain tag received from a user device, slave nodes may output the tag search request for intrinsically outputting a tag desired to be found by a user.

The master node 300 according to the present disclosure may repeatedly transmit the tag search request for determining the location of the tag, and the slave node located within a certain distance from the tag 100 may modulate the tag search signal by using the identifying data for identifying the tag and output the modulated tag search signal to a space where the tag is located. Also, the slave node 200 may retransmit a response signal received from the tag 100 to the master node 300. A master node response pulse according to the present disclosure may be retransmitted to the master node.

The method of determining a location of a tag performed by the location determining system including the tag 100, the master node 300, and the plurality of slave nodes 200, according to the present disclosure may be repeated to reduce an error of the determined location of the tag. According to an embodiment, measurement may be performed n times to reduce an error to a certain threshold range (for example, 0 to 10 cm). Also, when required, the master node according to the present disclosure may repeat arrival time measurement of pulses between all master node-slave node (all node pairs) and obtain an average value of the repeatedly measured arrival times of pulses. The master node or the user device according to the present disclosure may determine the location of the tag by using the average value of the repeatedly measured arrival times of pulses.

The master node 300 according to the present disclosure may transmit coordinates indicating the determined location of the tag 100 to the user device. The determined location of the tag 100 may be displayed on a screen of the user device, according to a general location display method. Regarding the displaying of the determined location of the tag 100 on the screen of the user device, the tag and coordinate values of a coordinate axis may not be displayed, but a relative location of the tag 100 determined based on the user device may be displayed by using a marking method (for example, a dot or an arrow). In other words, the determined location of the tag displayed in the user device is not necessarily limited to a form of Cartesian coordinate set, and may be displayed on a user display (or a display realizing augmented reality) at an arbitrary point on an indoor space based on the user device.

Also, a response signal received from the tag 100 may be simultaneously received by the plurality of slave nodes 200 and the master node 300. Referring to FIG. 8, when one of three nodes including the two slave nodes 200 and one master node 300 does not receive the response signal from the tag 100, an error may occur in the determined location of the tag or it may be difficult to determine the location of the tag. However, the number of nodes required to determine the location of the tag is not limited thereto. According to an embodiment, the first response signal and the second response signal according to the present disclosure may include information about the arrival times of the first response signal and second response signal.

According to an embodiment, the process of determining the location of the tag 100 may be performed by the master node 300 or by the user device 400. For example, the master node 300 may transmit the received first response signal and second response signal to the user device through the user communication interface and the user device may determine the location of the tag 100 by using the received first response signal and second response signal. In other words, the master node 300 may only perform a function of transmitting the first response signal or the second response signal received from the tag 100.

Figure 9:
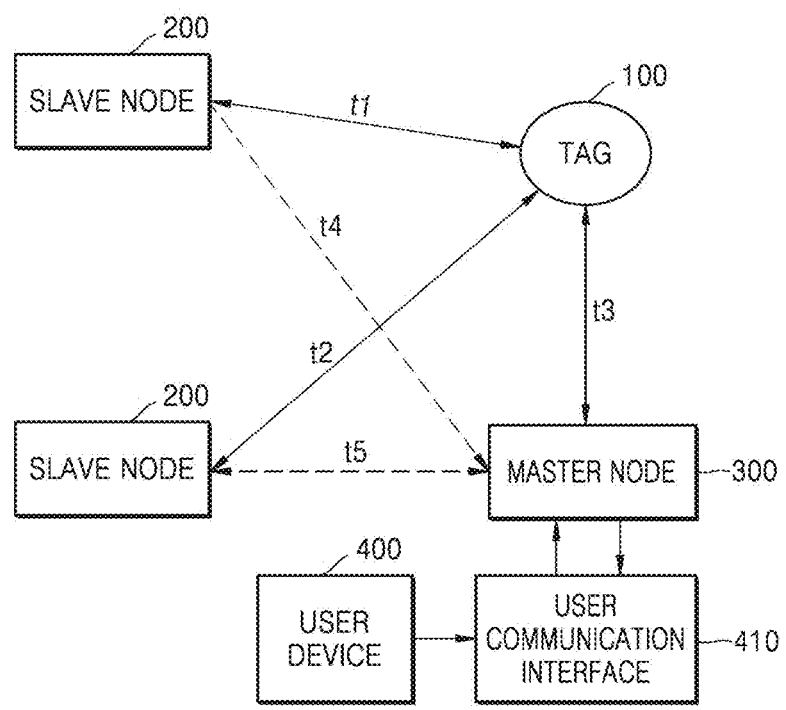
FIG. 9 is a diagram for describing a method, performed by a user device connected to a master node, of determining a location of a tag.

FIG. 9 is a diagram for describing a method, performed by a user device connected to a master node, of determining a location of a tag.

Referring to FIG. 9, t1, t2, and t3 indicate propagation times of response signals received by the plurality of slave nodes 200 and the master node 300 from the tag 100. The propagation time described in the present specification may denote an arrival time for an RF signal to reach a second point from a first point. For example, t1 and t2 may each indicate a time taken for a first response signal to reach the slave node 200 from the tag 100, and t3 may indicate a time taken for the first response signal to reach the master node 300 from the tag 100. Also, t4 and t5 each indicate a time taken for a second response signal to reach the master node 300 from the slave node 200. In other words, t4 and t5 may each denote an arrival time of the second response signal between the slave node 200 and the master node 300 when the first response signal received by the tag 100 is retransmitted to the slave node 200.

A tag search signal, a first response signal, and a second response signal described in the present specification may each be a UWB single pulse signal, and an arrival time of the first response signal and an arrival time of the second response signal may be represented as arrival times of pulses. Hereinafter, a location determining process of the tag 100 performed by the user device 400 will be described.

The user device 400 may receive the first response signal and the second response signal from the master node 300. The user device 400 may measure arrival times (t1, t2, and t3) of the first response signals transmitted from the tag 100 to the slave nodes 200 and the master node 300, and measure arrival times (t4 and t5) of the second response signals transmitted from the plurality of slave nodes 200 to the master node 300.

According to an embodiment, when the master node 300 and the plurality of slave nodes 200 are fixed in a space where the tag is located, the arrival times (t4 and t5) of the second response signals received by the master node 300 from the slave nodes 200 may be invariant values. According to another embodiment, a process for measuring arrival times of pulses between all pairs of master node 300 and slave node 200 may be pre-performed before the master node 300 according to the present disclosure transmits a tag search request to the slave node.

In other words, the master node 300 or the user device according to the present disclosure may pre-measure (for example, perform a standard calibration process) arrival times of pulses between the master node 300 and the plurality of slave nodes 200 fixed in a space where the tag is located, and store information about the measured arrival times of the pulses between the master node 300 and the plurality of slave nodes 200 in a memory of the user device or master node.

The user device 400 may calculate a difference between the arrival times of at least some first response signals and the arrival times of at least some second response signals. According to an embodiment, the user device 400 may generate transition variables by weighting the arrival times of the first response signals and the arrival times of the second response signals.

$$\Delta_a = t_1 + t_4 - t_3 \quad \text{Equation 1}$$

Here, $\Delta_a$ is an input of a transition function and thus denotes a first transition variable, t1 denotes the arrival time of the first response signal transmitted from the tag 100 to the slave node 200, t3 denotes the arrival time of the first response signal transmitted from the tag 100 to the master node 300, and t4 denotes the arrival time of the second response signal transmitted from the slave node 200 to the master node 300.

$$\Delta_b = t_2 + t_5 - t_3 \quad \text{Equation 2}$$

Here, $\Delta_b$ is an input of the transition function and thus denotes a second transition variable, t2 denotes the arrival time of the first response signal transmitted from the tag 100 to the slave node 200, t3 denotes the arrival time of the first response signal transmitted from the tag 100 to the master node 300, and 54 denotes the arrival time of the second response signal transmitted from the slave node 200 to the master node 300. In other words, the user device may generate transition variables by weighting the arrival times of the first response signals and the arrival times of the second response signals, by using Equations 1 and 2.

$$(x, y) = F(\Delta_a, \Delta_b) \quad \text{Equation 3}$$

Here, (x,y) denotes coordinates indicating a determined location of the tag and $F(\Delta_a, \Delta_b)$ denotes a transition function using a generated transition variable as an input and the coordinates indicating the location of the tag as an output. The user device 400 according to the present disclosure may generate the transition variables by weighting the arrival times of the first response signals and the arrival times of the second response signals, and determine the coordinates indicating the location of the tag by using the transition function using the generated transition variables as inputs. The user device 400 may calculate relative coordinates of the tag in a coordinate system using the user device or the master node as an origin.

Here, it is described that the user device 400 measures the arrival times of the first response signals and the arrival times of the second response signals, and determines the location of the tag by using the measured arrival times of the first response signals and second response signals, but the process of determining the location of the tag by using the measured arrival times of the first response signals and second response signals may be performed by the master node 300. The process of the user device 400 or master node 300 determining the location of the tag by using Equations 1 to 3 may include a general triangulation method. The arrival times of the first response signals and the arrival times of the second response signals described in the present specification may denote a flight time of an RF signal between two arbitrary points. In other words, the arrival times of the first response signals and the arrival times of the second response signals may indicate time of flight (TOF).

Figure 10:
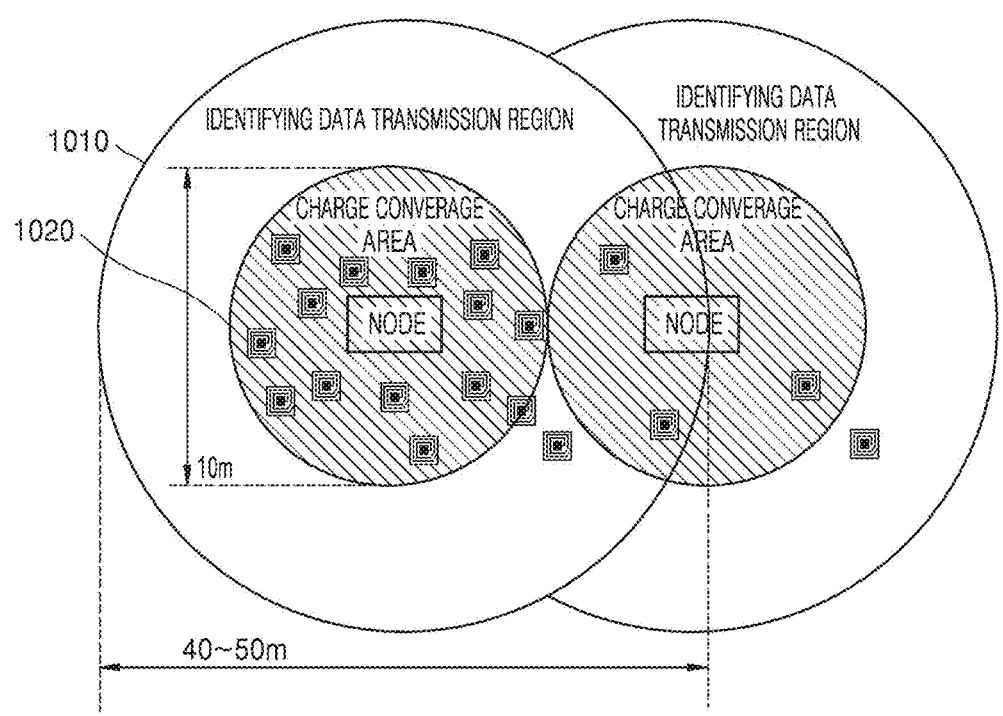
FIG. 10 is a diagram showing a range where a tag is chargeable and a range where a location of the tag is identifiable, according to an embodiment.

FIG. 10 is a diagram showing a range where a tag is chargeable and a range where a location of the tag is identifiable, according to an embodiment.

According to an embodiment, in the tag 100 according to the present disclosure, a distance from which a tag search signal is receivable and a distance from which energy is chargeable from at least one node may be different from each other. For example, the tag 100 may receive the tag search signal from at least one node located within a first threshold distance from among a plurality of slave nodes and a master node, obtain identifying data included in the received tag search signal, and output a response signal based on the obtained identifying data. Also, the tag 100 may charge an energy storage element therein by using a tag search signal received from at least one node located within a second threshold distance from among the plurality of slave nodes and the master node. However, according to another embodiment, a tag may be charged only by a node closest to the tag.

According to an embodiment, the first threshold distance related to a location determination range of the tag 100 may be greater than the second threshold distance related to a charge range. For example, the first threshold distance may be 20 to 25 m and the second threshold distance may be 10 m, but are not limited thereto. In other words, when an arbitrary node is set based on a center of a circle, a tag may be chargeable in a region of which a distance from the center of the circle is equal to or less than 10 m (a circle with a radius of 10 m around the arbitrary node) and a location of the tag may be identifiable in a region of which a distance from the center of the circle is equal to or less than 40 to 50 m (a circle with a diameter of 40 to 50 m around the arbitrary node, a circle with a radius of 20 to 25 m around the arbitrary node), but an embodiment is not limited thereto. The first threshold distance related to the energy charge range of the tag 100 may be improved by using a directional beam deflection antenna or narrow beam antennas.

According to an embodiment, the tag 100 according to the present disclosure may charge the energy storage element therein by using power of an auxiliary charging device located within a surrounding environment. In other words, instead of charging the energy storage element in the tag 100 by using the tag search signal received from at least one node located within the first threshold distance, the tag 100 according to the present disclosure may charge the energy storage element therein by using power of the auxiliary charging device within the surrounding environment and output the response signal by using power of the charged energy storage element.

For example, a plurality of tags located in a region within the first threshold distance from a node 1030 may simultaneously charge energy storage elements in the tags by using a tag search signal received from the node 1030 or power of an auxiliary charging device in a surrounding environment. Tags located in a region greater than the first threshold distance and less than the second threshold distance from the node 1030 may charge energy storage elements therein by only using an auxiliary charging device in a surrounding environment of the tags.

The tags located in the region greater than the first threshold distance and less than the second threshold distance from the node 1030 may be unable to charge the energy storage elements by using a tag search signal received from the node 1030, but may receive the tag search signal, obtain identifying data in the received tag search signal, and output a response signal when the obtained identifying data matches identification information pre-stored in the tags. Also, the number of tags identifiable by the master node and the slave node according to the present disclosure may vary based on the length of a packet in the tag search signal modulated in units of packets.

Figure 11:
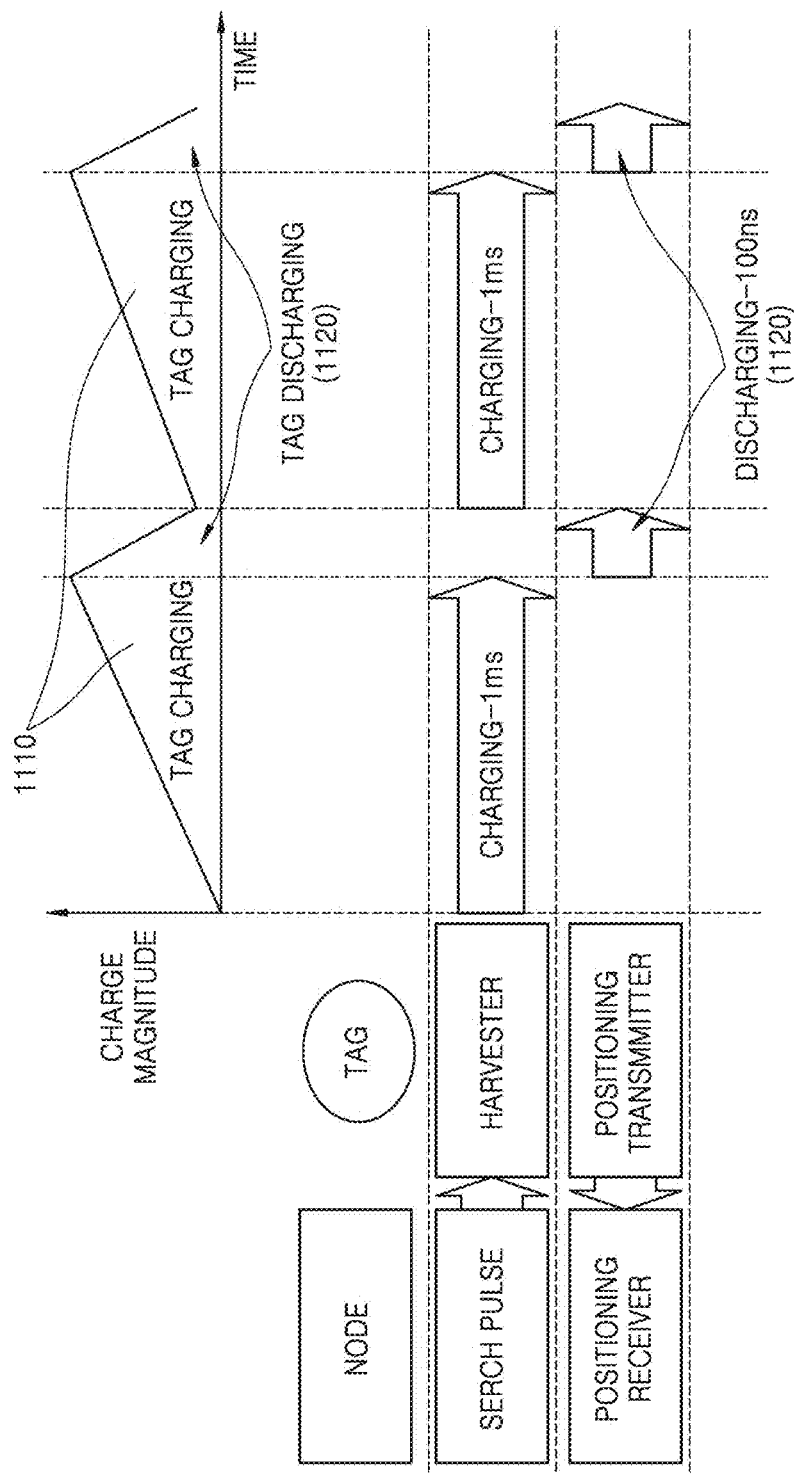
FIG. 11 is a diagram showing a charging cycle of an energy storage element in a tag and a discharging cycle of the energy storage element, according to an embodiment.

FIG. 11 is a diagram showing a charging cycle of an energy storage element in a tag and a discharging cycle of the energy storage element, according to an embodiment.

Charging of an energy storage element in a tag and outputting of a first response signal may be performed as follows. The tag 100 according to the present disclosure receives a tag search signal from at least one node and charges an energy storage element during a certain charging cycle by using the received tag search signal. According to an embodiment, the tag 100 may charge a capacitor in the tag during the certain charging cycle by using the received tag search signal, and as a result, a voltage or charge amount in the capacitor may increase. According to an embodiment, the certain charging cycle may be 1 ms, but is not limited thereto.

According to an embodiment, the tag 100 may output a response signal when the energy storage element therein is charged to a certain numerical value or above and identifying data obtained from the received tag search signal matches identification information pre-stored in the tag. When the tag 100 according to the present disclosure outputs the response signal, the energy storage element therein may be discharged during a certain discharging cycle. According to an embodiment, the certain discharging cycle may be 100 ns, but is not limited thereto.

Also, a frequency band of the tag search signal according to the present disclosure may be different from frequency bands of a first response signal and second response signal, and thus the charging of the energy storage element in the tag by the tag search signal and the discharging of the energy storage element by the output of the response signal do not interfere with each other and may be independently performed in the frequency band of the tag search signal and the frequency band of the first response signal.

Referring to FIG. 11, it is illustrated as if the energy storage element in the tag is not discharged while the energy storage element in the tag is charged, but the charging of the energy storage element and the discharging of the energy storage element may be performed together when the energy storage element in the tag according to the present disclosure is charged to the certain numerical value or above. For example, when the tag 100 outputs the first response signal, the energy storage element in the tag may be discharged, and even while the energy storage element is discharged, the tag 100 may receive the tag search signal from at least one node.

In other words, because the frequency band of the tag search signal is different from the frequency bands of the first response signal and second response signal, the charging of the energy storage element in the tag by the tag search signal and the discharging of the energy storage element by the output of the response signal may be independently performed in the frequency band of the tag search signal and the frequency band of the first response signal, and as a result, the discharging of the energy storage element by the output of the first response signal and the charging of the energy storage element by the tag search signal may be performed together.

According to an embodiment, the energy storage element in the tag 100 according to the present disclosure may be pre-charged before the tag search signal is received, and when the energy storage element is pre-charged, the first response signal may be output by only determining whether the identifying data obtained from the tag search signal matches the pre-stored identification information of the tag. According to another embodiment, the tag 100 may output the response signal before the energy storage element in the tag is fully charged (for example, charged to the certain numerical value or above), or may output the response signal only after the energy storage element in the tag is fully charged. A condition for the tag 100 according to the present disclosure to output the response signal in response to the tag search signal may be changed.

In a general location determining system, all tags capable of receiving a tag search signal from a certain node respond to the received tag search signal, but in a tag according to the present disclosure, a tag including identification information matching identifying data may output a response signal in a form of a single pulse. Thus, a location determining system using the tag 100 according to the present disclosure may quickly determine a location of the tag.

Figure 12:
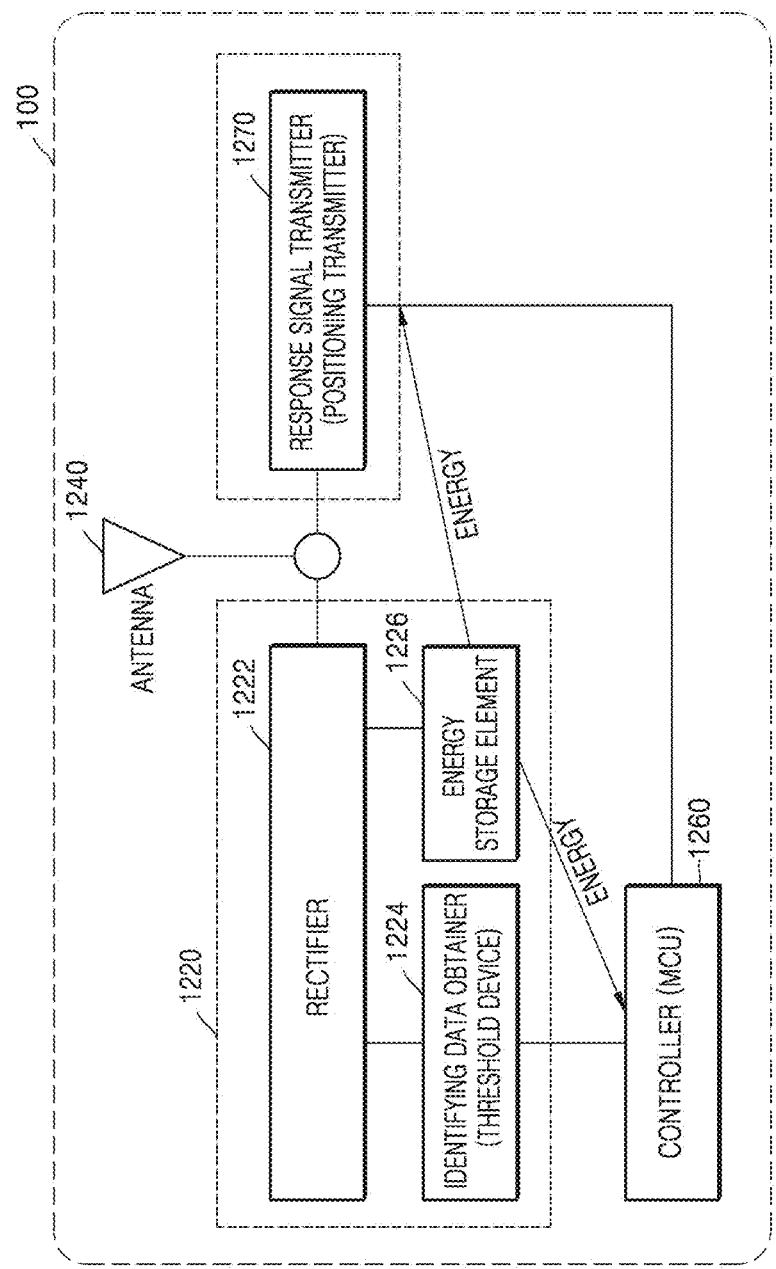
FIG. 12 is a diagram showing a structure of a tag, according to an embodiment.

FIG. 12 is a diagram showing a structure of a tag, according to an embodiment.

According to an embodiment, the tag 100 may include an antenna 1240, a harvester 1220, and a controller 1260. According to another embodiment, the tag 100 may further include a response signal transmitter 1270.

The antenna 1240 may receive, from at least one of a plurality of slave nodes, a tag search signal including identifying data for identifying the tag, and output a response signal. The antenna 1240 according to the present disclosure may be included in the harvester 1220 or may be connected to a rectifier. Thus, the harvester 1220 may receive the tag search signal and charge an energy storage element by using the received tag search signal.

The harvester 1220 includes the rectifier 1222, an identifying data obtainer 1224, and the energy storage element 1226. For example, the harvester 1220 may charge the energy storage element by using the received tag search signal. According to another embodiment, the identifying data obtainer included in the harvester 1220 may be included in the controller 1260. Also, the harvester 1220 may directly receive the tag search signal by including an antenna. In this case, the antenna 1240 may only perform a function of transmitting the first response signal. The tag according to the present disclosure does not require a separate RF receiver, and may receive the tag search signal modulated by using the identifying data by using the harvester 1220, obtain energy from the received tag search signal, and obtain the identifying data included in the tag search signal.

The harvester 1220 according to the present disclosure is an accumulator and may accumulate energy or information. The harvester 1220 according to the present disclosure may be connected to the antenna 1240, the response signal transmitter 1270, and the controller 1260. For example, the harvester 1220 may charge the energy storage element 1226 in the tag by using the tag search signal received from the node, but may charge the energy storage element 1226 by using power of an auxiliary charging device in an environment around the tag. Also, the harvester 1220 may be charged only by a node closest to the tag including the harvester.

In particular, the harvester 1220 according to the present disclosure may charge the energy storage element by using the tag search signal including the identifying data not matching the identification information in the tag even when the identifying data included in the received tag search signal does not match the identification information in the tag that received the tag search signal. According to an embodiment, a speed of the harvester 1220 charging the energy storage element may vary based on a distance between the tag that received the tag search signal and a master node or slave node.

According to an embodiment, the harvester 1220 receives the modulated tag search signal, obtains the identifying data from the received tag search signal, and transmit the obtained identifying data to the controller. However, according to another embodiment, the controller 1260 may perform the process of obtaining the identifying data from the received tag search signal. The identifying data obtained by the harvester 1220 is compared with the identification information pre-stored in the tag, and when the obtained identifying data matches the identification information pre-stored in the tag, the tag may output a response signal.

Accordingly, a process of the harvester in the tag obtaining the identifying data and comparing the identifying data with the identification information pre-stored in the tag may correspond to a tag authentication process. The tag may perform the tag authentication process to determine whether the tag search signal is a signal for invoking itself. In other words, the harvester may not only receive energy, but also recognize a command invoking the tag by using the identifying data.

The controller 1260 may include a demodulator. According to an embodiment, the controller 1260 may further include the identifying data obtainer 1224. For example, the controller 1260 may be configured to obtain the identifying data from the received tag search signal, determine whether the obtained identifying data matches the identification information pre-stored in the tag, and control the antenna to output the response signal when the energy storage element is charged to a certain numerical value or above and the obtained identifying data matches the identification information pre-stored in the tag. According to an embodiment, the controller 1260 may be a low-power micro-controller (MCU).

The response signal transmitter 1270 may receive a response signal transmit command from the controller 1260 and output the response signal through the antenna 1240 according to the received response signal transmit command, when the energy storage element 1226 in the tag is charged to the certain numerical value or above and the identifying data obtained from the tag search signal matches the identification information pre-stored in the tag. According to another embodiment, a function of the response signal transmitter 1270 may be performed by the controller 1260.

The rectifier 1222 may convert the received tag search signal into direct current (DC) energy. For example, the tag search signal according to the present disclosure is an alternating current (AC) signal and may oscillate at a certain frequency. The rectifier 1222 may receive the tag search signal that is the AC signal, converts the received tag search signal into the DC energy, and transmit the DC energy to the energy storage element 1226. The harvester 1220 may charge the capacitor in the energy storage element by using the DC energy obtained by the rectifier 1222. For example, the rectifier may be manufactured by using a general method for converting a general diode circuit or periodic RF frequency oscillation into a DC voltage.

The identifying data obtainer 1224 may further include a demodulator. For example, the identifying data obtainer 1224 may demodulate the modulated tag search signal and obtain the identifying data from the demodulated tag search signal. The tag search signal according to the present disclosure may be binary-modulated in units of packets by using the identifying data, by a master node or a slave node. The identifying data obtainer 1224 may obtain the identifying data and transmit the obtained identifying data to the controller such that the controller authenticates whether the received tag search signal is for invoking the tag that received the tag search signal. According to another embodiment, the identifying data obtainer 1224 may be included in the controller 1260 and in this case, the controller 1260 may demodulate the received tag search signal and obtain the identifying data from the demodulated tag search signal.

According to an embodiment, the identifying data obtainer 1224 may be a threshold device. The threshold device may demodulate the tag search signal in an analog form demodulated by using the identifying data, obtain the identifying data by decoding the demodulated tag search signal, and represent the obtained identifying data in a binary form. Identifying data described in the present specification may include at least one of tag identification information pre-stored in tag, registration confirmation information indicating whether the tag is stored in a user device, identification information of a network (network ID) including at least one of a master node, at least one slave node, and the tag, and an identification range of the tag or network ID (desired ID range). The tag identification information may be binary data for intrinsically identifying the tag.

Unlike a general tag, a tag described in the present disclosure may operate without a battery (power source) and do not include a receiver, and thus the size of the tag may be small (for example, about 10 mm) The tag according to the present disclosure may be attached to any target object and may include a rigid substrate where a controller or a harvester is located and flexible material.

According to an embodiment, because a tag search signal emitted by nodes is modulated by using identifying data of a target tag to be found, only one target tag matching the identifying data may respond to the tag search signal in a space where at least one tag is located. Accordingly, a tag outputting a first response signal in response to the tag search signal modulated by using the identifying data may provide an accurate tag location to a user.

Figure 13:
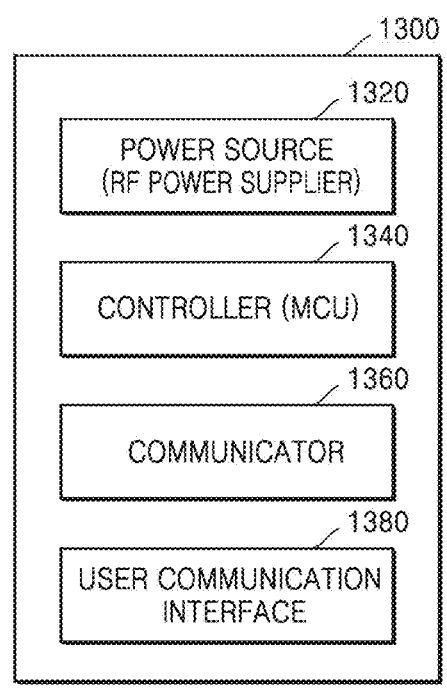
FIG. 13 is a block diagram of a master node according to an embodiment.

FIG. 13 is a block diagram of a master node according to an embodiment.

A master node 1300 may include a power source 1320, a controller 1340, a communicator 1360, and a user communication interface 1380. For example, the master node 1300 may receive identifying data from a user device, transmit a tag search request including the received identifying data to a slave node, output a tag search signal modulated by using the identifying data to a space where a tag is located, receive a first response signal from the tag responding to the output tag search signal, receive a second response signal indicating a location of the tag from a plurality of slave nodes that received the first response signal, and transmit the received first response signal and second response signal to the user device connected to the master node. According to another embodiment, the master node 1300 may not transmit the received first response signal and second response signal to the user device, but may determine the location of the tag by using the received first response signal and second response signal.

The power source 1320 may supply power to the controller 1340, the communicator 1360, and the user communication interface 1380. For example, the master node 1360 may receive power from the power source 1320 in the master node 1360 to output the tag search signal modulated by using the identifying data.

The controller 1340 may include a modulator. For example, the controller 1340 may control the communicator 1360 to transmit the tag search request including the identifying data for identifying the tag to the plurality of slave nodes connected to the master node, output the tag search signal modulated by using the identifying data to the space where the tag is located, receive the first response signal from the tag responding to the transmitted tag search signal, and receive the second response signal indicating the location of the tag from the plurality of slave nodes that received the first response signal.

A function of the controller 1340 according to the present disclosure may be performed via at least one processor included in the controller 1340. The processor included in the controller 1340 according to the present disclosure may be a micro controller unit (MCU), and the function of the controller 1340 may be performed by a single processor or by a plurality of processors.

For example, the modulator may binary-modulate the tag search signal by using the identifying data received from the user device. According to an embodiment, the modulator may modulate the tag search signal in units of packets by using the identifying data received from the user device. For example, a master node or slave node according to the present disclosure outputting a tag search signal modulated by using identifying data for intrinsically identifying a certain tag may correspond to a process of commanding a tag matching the identifying data used to modulate the tag search signal to output a response signal.

According to an embodiment, the tag search signal may be modulated at a data transmission rate of 1 to 10 Kbps, and the tag search signal may be modulated at 0.99 duty cycle without a significant loss of a charging speed due to data transmission.

The communicator 1360 may include a first response signal receiver 1362, a second response signal receiver 1364, a tag search request transmitter 1366, and a tag search signal transmitter 1368. For example, the communicator 1360 may include at least one antenna and an envelope detector. For example, the communicator 1360 may output the tag search signal, receive the first response signal from the tag, receive the second response signal from the slave node, or transmit the tag search request to the slave node, according to control of the controller 1340. According to an embodiment, a frequency band of the tag search signal and a frequency band of the first response signal may be different from each other, and the frequency band of the tag search signal may be wider and have larger wireless power than the frequency band of the first response signal.

A master node may set a time when a response signal is received from a tag as a leading edge of an envelope and slave nodes that received a first response signal from the tag from among a plurality of slave nodes connected to the master node may retransmit the received first response signal to the master node at a point of time when the leading edge of the envelope is detected. Alternatively, the slave nodes that received the first response signal from the tag from among the plurality of slave nodes connected to the master node may retransmit a second response signal generated by using the first response signal to the master node at a point of time when the leading edge of the envelope is detected.

The master node 1360 may extract an envelope from the received first response signal and second response signal and measure arrival times of the first response signal and second response signal by using a leading edge or falling edge of the extracted envelope. Also, the master node may calculate a time difference between the arrival time of the first response signal and the arrival time of the second response signal.

Also, according to another embodiment, the master node may transmit the received first response signal and second response signal to the user device connected to the master node, and the user device may measure the arrival times of the first response signal and second response signal. The user device may measure a difference between the measured arrival time of the first response signal and the measured arrival time of the second response signal.

The user communication interface 1380 may transmit the received first response signal and second response signal to the user device connected to the master node or receive the identifying data from the user device. For example, the identifying data received by the master node via the user communication interface 1380 may be binary data for intrinsically identifying the tag pre-registered in the user device. The user communication interface 1380 according to the present disclosure may be connected to the controller 1340.

Figure 14:
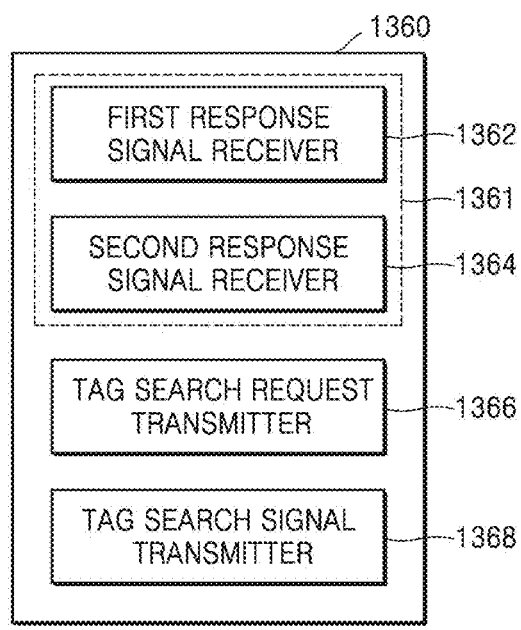
FIG. 14 is a diagram for describing in detail a communicator in the embodiment of FIG. 13.

FIG. 14 is a diagram for describing in detail a communicator in the embodiment of FIG. 13.

For example, the first response signal receiver 1362 may include at least one antenna and receive the first response signal output by the tag in response to the tag search signal by using the antenna. According to another embodiment, the first response signal receiver 1362 may receive the first response signal from the tag by using an external antenna. According to an embodiment, the first response signal receiver may be a UWB receiver. Also, the first response signal receiver may include at least one low pass frequency filter and an envelope detector, and detect an envelope in a low frequency pulse form by blocking a high frequency component from the received first response signal by using the low pass frequency filter.

Also, the second response signal receiver 1364 may include at least one antenna and receive the second response signal from the slave node. According to another embodiment, the second response signal receiver 1364 may receive the second response signal from the slave node by using an external antenna. According to an embodiment, the second response signal receiver 1364 may be a retranslation receiver 380.

The tag search request transmitter 1366 may transmit the tag search request including the identifying data received from the user device to the plurality of slave nodes connected to the master node. The slave node may modulate the tag search signal by using the identifying data included in the tag search request and output the tag search signal modulated by using the identifying data for intrinsically identifying a target tag to be found by a user. The slave node may activate the tag search signal transmitter according to the tag search request transmitted from the tag search request transmitter 1366, and modulate the tag search signal by using the identifying data included in the tag search request.

The tag search signal transmitter 1368 may include at least one antenna and transmit the tag search signal for fining the tag according to control of the controller 1340.

Figure 15:
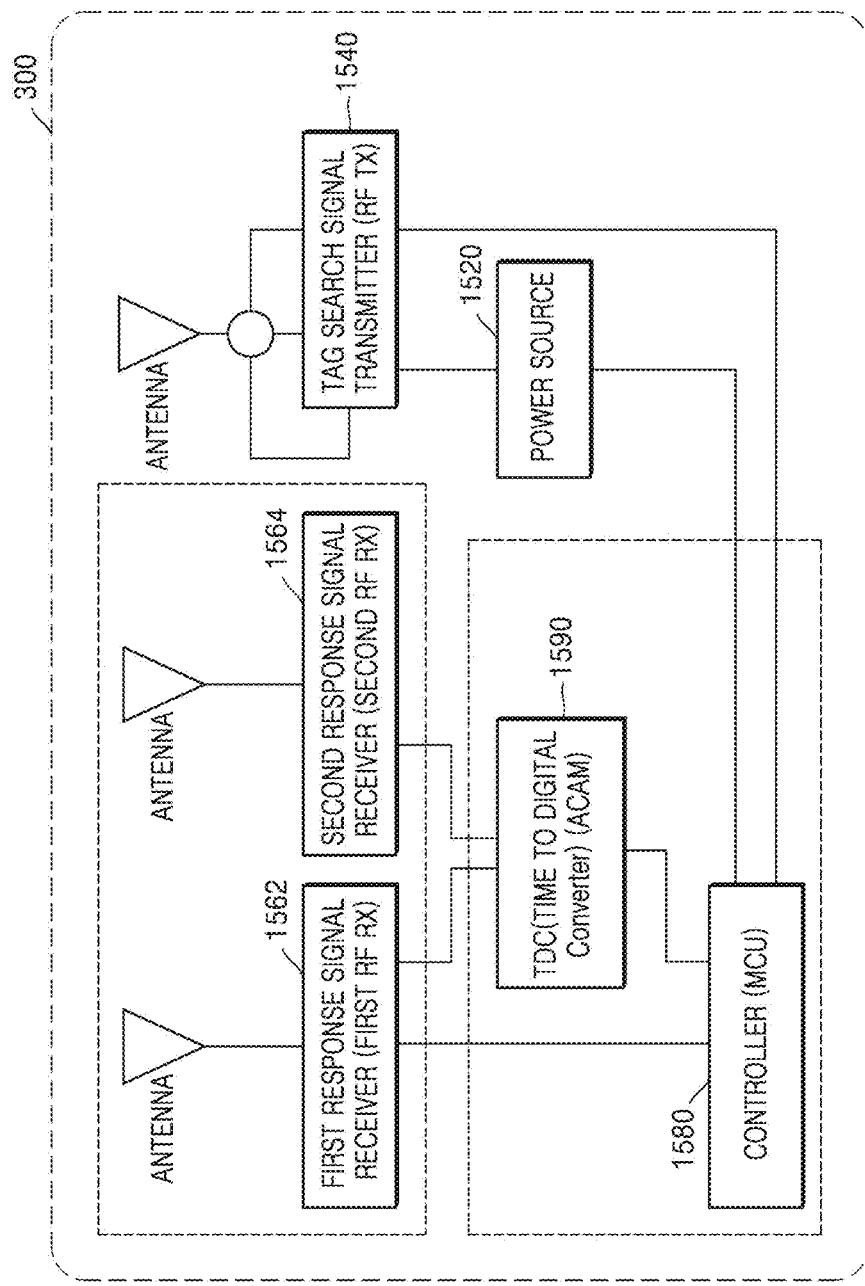
FIG. 15 is a diagram showing a structure of a master tag, according to another embodiment.

FIG. 15 is a diagram showing a structure of a master tag, according to another embodiment.

The master node 300 according to another embodiment may include a power source 1520, a tag search signal transmitter 1540, a response signal receiver 1560, and a controller 1580. Because the power source 1520 corresponds to the power source 1320 of FIG. 13, detailed descriptions thereof are omitted. For example, the tag search signal transmitter 1540 may include a single antenna and output a tag search signal via the single antenna. According to another embodiment, the tag search signal transmitter 1540 may include a plurality of antennas. The tag search signal transmitter 1540 according to the present disclosure may be a UWB transmitter and corresponds to the tag search signal transmitter of FIG. 14, and thus detailed descriptions thereof are omitted.

The response signal receiver 1560 may include a first response signal receiver 1562 and a second response signal receiver 1564. The response signal receiver 1560 may receive a first response signal from a tag responding to the tag search signal and receive the first response signal retransmitted from a slave node that received the first response signal. According to another embodiment, the response signal receiver 1560 may receive the first response signal from the tag and a second response signal generated by the slave node that received the first response signal by using the first response signal from the tag. The response signal receiver 1560 may include at least one antenna and may receive the first response signal and the second response signal via the antenna according to control of the controller 1580.

Because the first response signal receiver 1562 corresponds to the first response signal receiver 1362 of FIG. 14, detailed descriptions thereof are omitted. Because the second response signal receiver 1564 corresponds to the second response signal receiver 1364 of FIG. 14, detailed descriptions thereof are omitted.

Referring to FIG. 15, the first response signal receiver 1562, the second response signal receiver 1564, and the tag search signal transmitter 1540 may each include at least one antenna, wherein the first response signal receiver 1562 and the second response signal receiver 1564 may respectively receive the first response signal and the second response signal via the antenna included therein, and the tag search signal transmitter 1540 may transmit the tag search signal via the antenna included therein.

According to another embodiment, the first response signal receiver 1562 and the second response signal receiver 1564 may receive the first response signal and the second response signal and the tag search signal transmitter 1540 may transmit the tag search signal via at least one antenna located outside the first response signal receiver 1562, the second response signal receiver 1564, and the tag search signal transmitter 1540 included in the master node 300. According to an embodiment, functions of each of the first response signal receiver 1562, the second response signal receiver 1564, and the tag search signal transmitter 1540 may all be realized by the controller 1580.

The controller 1580 may further include a time to digital converter (TDC) 1590. According to another embodiment, the TDC 1590 may be located inside the master node or a user device separately from the controller 1580. Because the controller 1580 corresponds to the controller 1340 of FIG. 13, only the TDC 1590 will be described here.

For example, the TDC 1590 may measure an arrival time of the first response signal and an arrival time of the second response signal, calculate a time difference between the measured arrival time of the first response signal and the measured arrival time of the second response signal, and output the calculated time difference in a binary form. The user device may receive the calculated time difference between the measured arrival time of the first response signal and the measured arrival time of the second response signal from the TDC 1590 and determine a location of the tag by using the time difference between the measured arrival time of the first response signal and the measured arrival time of the second response signal.

Figure 16:
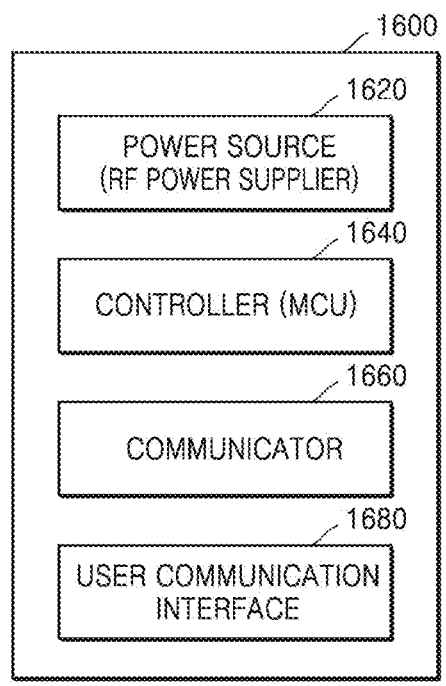
FIG. 16 is a block diagram of a slave node according to an embodiment.

FIG. 16 is a block diagram of a slave node according to an embodiment.

A slave node 1600 may include a power source 1620, a controller 1640, a communicator 1660, and a user communication interface 1680. For example, the slave node 1600 may receive identifying data from a master node, modulate a tag search signal by using the received identifying data, and output the modulated tag search signal to a space where a tag is located. Also, the slave node 1600 may receive a first response signal from the tag responding to the tag search signal and retransmit the received first response signal to the master node.

The power source 1620 may supply power to the controller 1640, the communicator 1660, and the user communication interface 1680. For example, the slave node 1600 may use the power supplied from the power source 1620 to transmit the tag search signal for finding the tag. Also, according to an embodiment, a master node and a plurality of slave nodes according to the present disclosure may be located at a home outlet terminal or a USB terminal in home appliances, and may receive power through the home outlet terminal or receive power from the home appliances through the USB terminal.

The controller 1640 may include a modulator. For example, the controller 1640 may control the communicator 1360 to receive a tag search request including the identifying data for identifying the tag, output the tag search signal modulated by using the identifying data to the space where the tag is located, receive the first response signal from the tag responding to the transmitted tag search signal, and receive a second response signal indicating a location of the tag from the plurality of slave nodes that received the first response signal. A function of the controller 1340 according to the present disclosure may be performed via at least one processor included in the controller 1340.

The processor included in the controller 1340 according to the present disclosure may be an MCU, and the function of the controller 1340 may be performed by a single processor or by a plurality of processors. For example, the modulator may modulate the tag search signal by using the identifying data received from a user device. According to an embodiment, the modulator may modulate the tag search signal in units of packets by using the identifying data received from the user device.

The communicator 1660 may include at least one antenna and an envelope detector. For example, the communicator 1660 may output the tag search signal, receive the first response signal from the tag, transmit the second response signal from the master node, or receive the tag search request to the master node, according to control of the controller 1640. A detailed configuration of the communicator will be described in detail with reference to FIG. 17.

The user communication interface 1380 may transmit the received first response signal and second response signal to the user device. Because the slave node 1600 according to the present disclosure may operate as a master node by being connected to the user device, the slave node 1600 may include the user communication interface for communicating with the user device. However, when the slave node operates as a slave node, functions of the user communication interface may be partially stopped.

Figure 17:
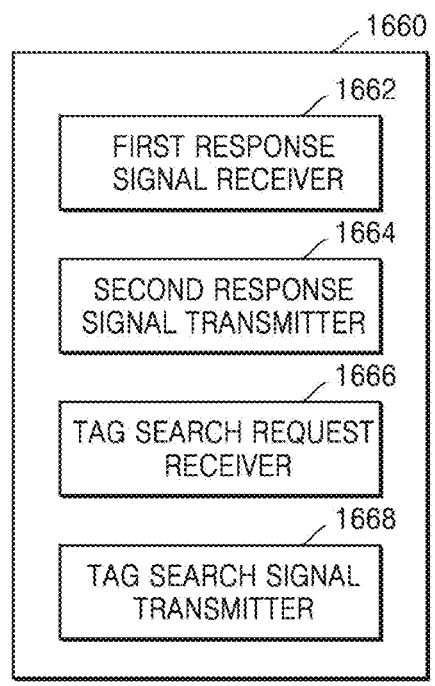
FIG. 17 is a diagram for describing in detail a communicator in the embodiment of FIG. 16.

FIG. 17 is a diagram for describing in detail a communicator in the embodiment of FIG. 16.

The communicator 1660 may include a first response signal receiver 1662, a second response signal transmitter 1664, a tag search request receiver 1666, and a tag search signal transmitter 1668. Because the first response signal receiver 1662 corresponds to the first response signal receiver 1362 of the master node of FIG. 14, detailed descriptions thereof are omitted. Also, because the tag search signal transmitter 1668 corresponds to the tag search signal transmitter 1368 of the master node of FIG. 14, detailed descriptions thereof are omitted.

The second response signal transmitter 1664 may transmit a second response signal generated by using a first response signal received from a tag, to the master node. In the present specification, a slave node may transmit a second response signal to a master node by retransmitting a first response signal received from a tag to the master node. According to an embodiment, the second response signal transmitter 1664 may include at least one repeater or retranslation transmitter. The tag search request receiver 1666 may receive a tag search request including identifying data from the master node. The slave node 1600 may receive the tag search request thereby recognizing the tag to be found by a user of a user device connected to the master node.

As a configuration for communication described in the present specification, a first response signal receiver, a second response signal receiver, a tag search request transmitter, and a tag search signal transmitter included in a master node, a first response signal receiver, a second response signal transmitter, a tag search request receiver, and a tag search signal transmitter included in a slave node, and a first response signal transmitter included in a tag may use an antenna for transmission and reception of a wireless signal. However, according to another embodiment, the master node, the slave node, and the tag may each use a single antenna included therein.

Figure 18:
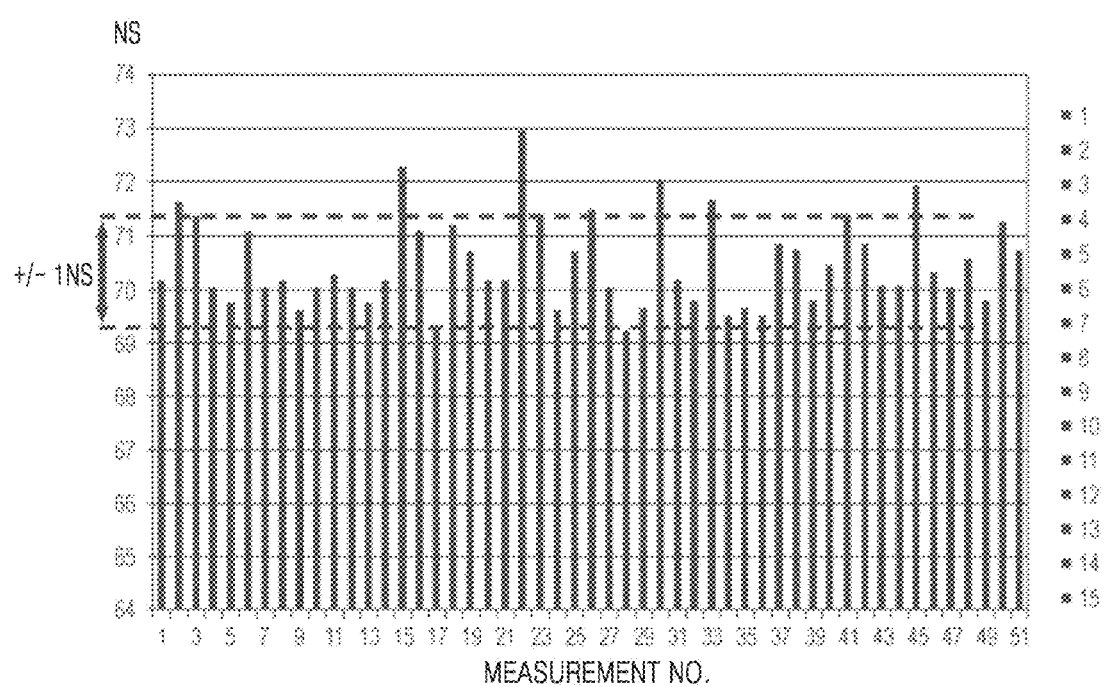
FIG. 18 is a diagram showing a result of experimentally measuring an error occurring when a location of a tag is determined.

FIG. 18 is a diagram showing a result of experimentally measuring an error occurring when a location of a tag is determined.

Referring to FIG. 18, when determining a location of a tag by using a location determining system according to the present disclosure, an error of a pulse propagation time measured between node pairs from the tag may be identified.

In FIG. 18, a horizontal axis indicates a measured number of times, and a vertical axis indicates a difference in pulse propagation times measured between node pairs from the tag.

To test the location determining system according to the present disclosure, two nodes are used, but to determine a location of a tag on a plane instead of a straight line, at least three nodes may be required. Also, to determine a location of a tag in a space Instead of a single plane, at least three nodes may be required.

According to a result of testing the location determining system according to the present disclosure a plurality of times, a time error indicated by a difference of pulse propagation times measured a plurality of times between node pairs from a tag is as small as +−1 ns. When the pulse propagation time is measured n times between the tag and the node pairs by using the location determining system according to the present disclosure, the time error may be reduced by $$\frac{1}{\sqrt{n}}.$$

Figure 19:
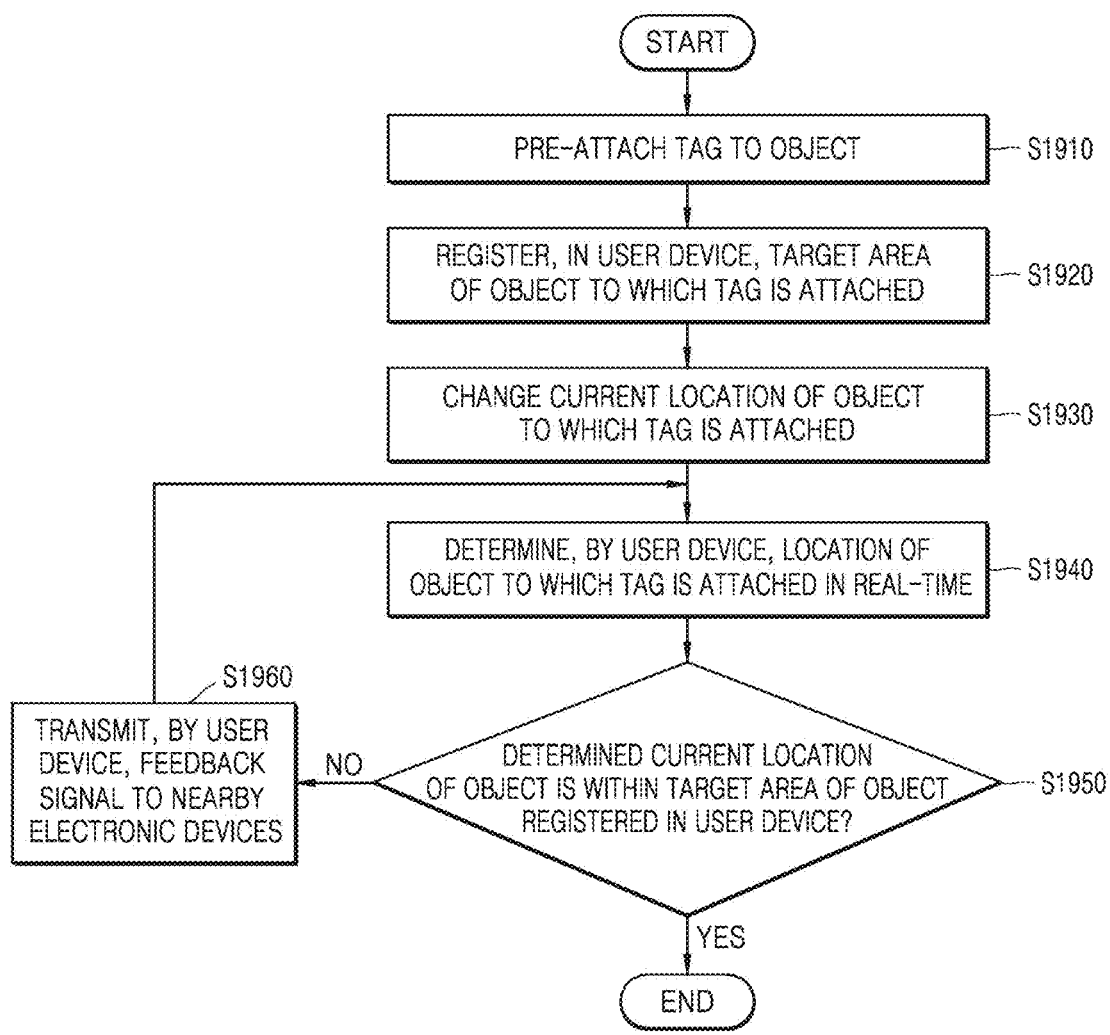
FIG. 19 is a diagram showing an embodiment to which a location determining system is applied.

FIG. 19 is a diagram showing an embodiment to which a location determining system is applied.

According to an embodiment, a location determining system including a tag, a master node, and a slave node according to the present disclosure may be used to teach children how to organize objects. In operation S1910, a tag is pre-attached to a target object. For example, a parent may pre-attach the tag to the object to be taught.

In operation S1920, a target area of the object to which the tag is attached may be registered in a user device. For example, the parent may attach the tag to the target object, locate the object in the target area, and pre-register the target area of the target object in the user device. The target area according to the present disclosure may denote a location of the target object in an indoor space set according to the parent's intention.

In operation S1930, a location of the object to which the tag is attached may be changed. For example, a child may play with the target object to which the tag is attached and then place the target object in a designated location, but may place the target object in a location other than the designated location.

In operation S1940, the user device may determine the location of the object to which the tag is attached in real-time. For example, in the location determining system including the tag, the master node, the slave node, and the user device according to the present disclosure, the user node may determine the location of the object to which the tag is attached by using a tag location determining method according to the present disclosure.

In operation S1950, the user device may determine whether the determined location of the object is within the target area of the object pre-registered in the user device. For example, the user device may set target coordinates of the target object determined in a coordinate system based on the user device as an origin, pre-register, in the user device, the target area having a radius of a pre-set threshold distance, and determine whether the target object is located within the pre-registered target area.

In operation S1960, when the determined location of the target object is not located within the target area, the user device may transmit a feedback signal to electronic devices located in a surrounding environment of the target object. For example, the feedback signal may include an image signal indicating, on screens of the electronic devices located in the surrounding environment of the target object, to bring the target object to the target area. According to another embodiment, the feedback signal may include a control signal restricting operations of the electronic devices located in the surrounding environment of the target object.

Figure 20:
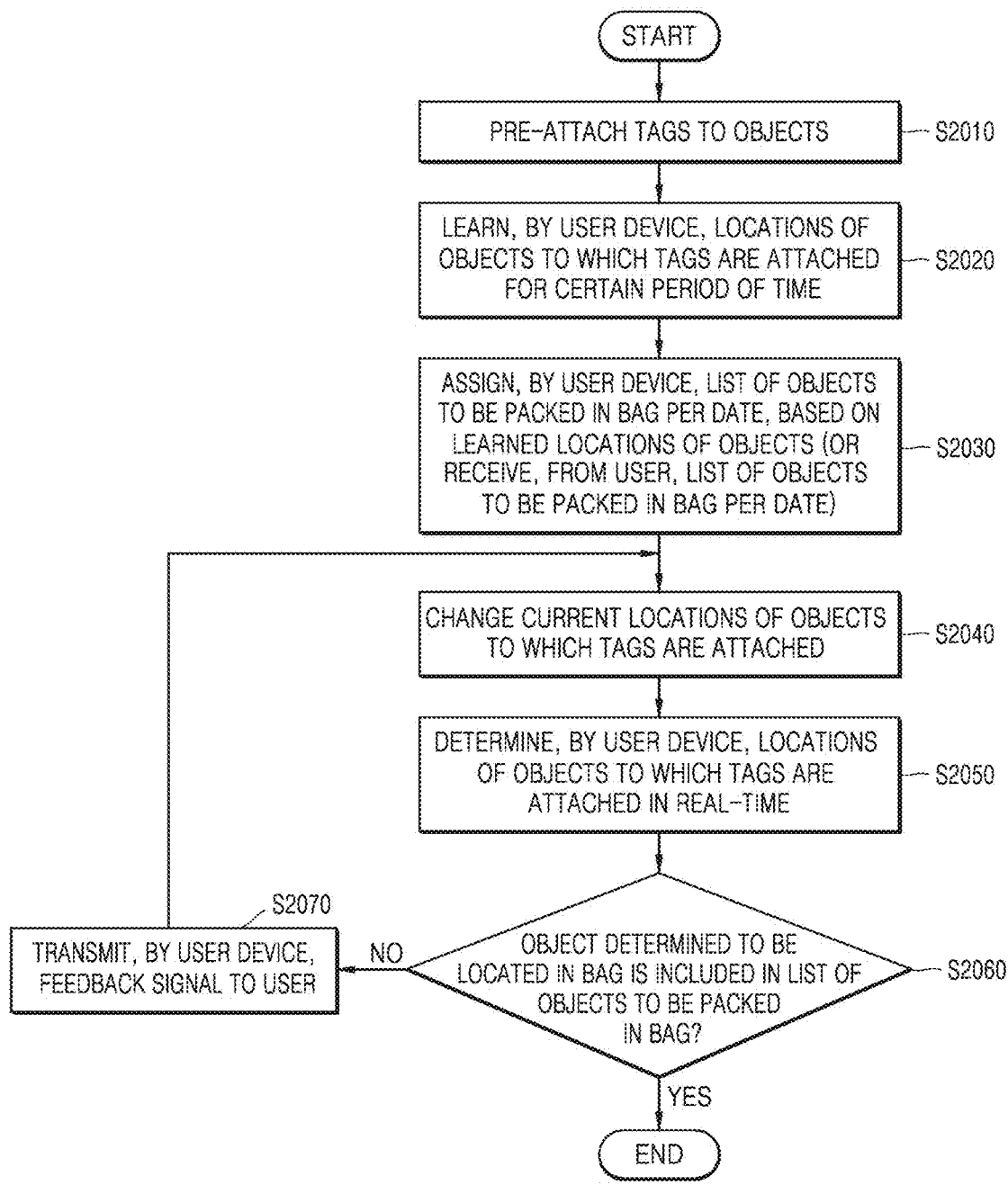
FIG. 20 is a diagram showing another embodiment to which a location determining system is applicable.

FIG. 20 is a diagram showing another embodiment to which a location determining system is applicable.

According to an embodiment, a location determining system including a tag, a master node, and a slave node according to the present disclosure may be used to teach children how to pack a bag. In operation S2010, tags are pre-attached to target objects. For example, a parent may pre-attach the tags to the objects to be taught.

In operation S2020, a user device may learn locations of the objects to which the tags are attached for a certain period of time. For example, the user device may learn the locations of the objects to which the tags are attached for one week.

In operation S2030, the user device may learn a list of objects to be located in a bag per day of the week (or per date) by using the learned locations of the objects. Alternatively, according to another embodiment, the list of objects to be located in the bag per day of the week (or per date) may be directly assigned by the user device.

In operation S2040, the locations of the objects to which the tags are attached may be changed. For example, a child may locate the objects to which the tags are attached in the bag for school. The child may locate the objects required per day of the week (or per date) in the bag, but may not locate the required objects in the bag.

In operation S2050, the user device may determine the locations of the objects to which the tags are attached in real-time. For example, in the location determining system including the tag, the master node, the slave node, and the user device according to the present disclosure, the user device may determine the locations of the objects to which the tags are attached by using a tag location determining method according to the present disclosure.

In operation S2060, the user device may determine whether the objects determined to be located in the bag is included in the list of objects to be located in the bag. For example, the list of objects to be located in the bag may be pre-registered in the user device, and the user device may determine whether the objects determined to be located in the bag match the list of objects registered in the user device.

In operation S2070, the user device may transmit a feedback signal to the user or electronic devices located in a surrounding environment of the bag when the objects determined to be located in the bag do not match the list of objects registered in the user device (for example, when an object not to be located in the bag is located in the bag or an object to be located in the bag is not located in the bag). For example, the feedback signal may include an image signal indicating, on screens of the electronic devices located in a surrounding environment of the target object, that there is a left-out object or there is an object not be located in the bag is currently located in the bag. According to another embodiment, the feedback signal may include a control signal controlling operations of the electronic devices located in the surrounding environment of the target object.

An embodiment of the location determining system including the tag, the master node, and the slave node according to the present disclosure is not limited to the embodiment shown in FIG. 19 or 20, and may be used for a B2B application or a location optimization service of objects in a household.

Figure 21:
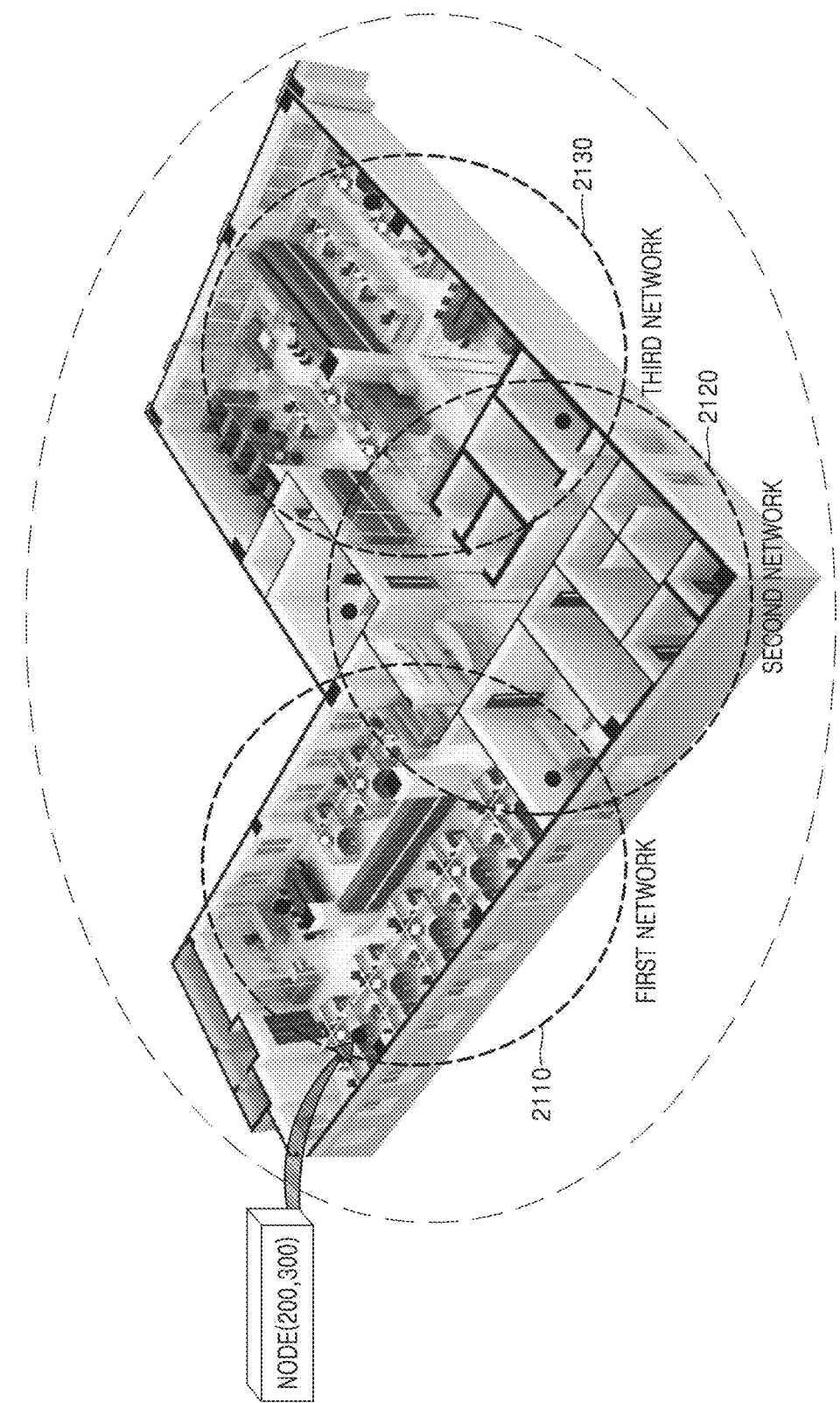
FIG. 21 is a diagram for describing scalability of a determining system.

FIG. 21 is a diagram for describing scalability of a determining system.

A plurality of tags, a master node, and a plurality of slave nodes used by a location determining system according to the present disclosure may form a first network 2110 in a first indoor space. Also, the plurality of tags, the master node, and the plurality of slave nodes may be located in a second indoor space to form a second network 2120 different from the first network 2110, and the plurality of tags, the master node, and the plurality of slave nodes may be located in a third indoor space to form a third network 2130.

According to an embodiment, the plurality of tags, the master node, and the plurality of slave nodes located in each of the first network 2110, the second network 2120, and the third network 2130 may be connected in a network unit, and as a result, may form a larger network. Accordingly, the location determining system according to the present disclosure may determine a location of a tag not only in the first indoor space, but also in the second indoor space or the third indoor space.

A method according to an embodiment may be recorded on a computer-readable recording medium by being realized in computer programs executed by using various computers. The computer-readable recording medium may include a program command, a data file, and a data structure alone or in combination. The program commands recorded in the computer-readable recording medium may be specially designed or well known to one of ordinary skill in the computer software field. Examples of the computer-readable recording medium include magnetic media, such as a hard disk, a floppy disk, and a magnetic tape, optical media such as CD-ROM and DVD, magneto-optical media such as a floptical disk, and ROM, RAM, and flash memory, which are hardware devices specifically configured to store and perform the program commands. Examples of the computer command include mechanical codes prepared by a compiler, and high-level languages executable by a computer by using an interpreter.

Some embodiments may also be realized in a form of a recording medium including computer-executable commands, such as a program module executed by a computer. A computer-readable recording medium may be an arbitrary available medium accessible by a computer, and examples thereof include all volatile and non-volatile media and separable and non-separable media. Further, examples of the computer-readable recording medium may include a computer storage medium and a communication medium. Examples of the computer storage medium include all volatile and non-volatile media and separable and non-separable media, which have been implemented by an arbitrary method or technology, for storing information such as computer-readable commands, data structures, program modules, and other data. The communication medium typically include a computer-readable command, a data structure, a program module, other data of a modulated data signal, or another transmission mechanism, and an example thereof includes an arbitrary information transmission medium. Further, some embodiments may be implemented as a computer program or computer program product including computer-executable commands, such as computer programs executed by a computer.

Although the embodiments of the present disclosure have been described in detail above, the scope of the present disclosure is not limited thereto, and various modifications and improvements made by one of ordinary skill in the art using the basic concepts of the present disclosure defined in the following claims are also within the scope of the present disclosure.

The invention claimed is:

1. A method, performed by a tag including an energy storage element, of transmitting a response signal regarding a tag search signal, the method comprising:
receiving, from at least one of a plurality of slave nodes, the tag search signal including identifying data for identifying the tag;
charging the energy storage element inside the tag by using the received tag search signal;
obtaining the identifying data for identifying the tag from the received tag search signal;
determining whether the obtained identifying data matches identification information pre-stored in the tag; and
when the energy storage element is charged to a certain numerical value or above and the obtained identifying data matches the identification information pre-stored in the tag, outputting the response signal regarding the tag search signal,
wherein the tag search signal is broadcast from the plurality of slave nodes at a request of a master node.

2. The method of claim 1, wherein the receiving of the tag search signal comprises receiving the tag search signal from at least one of the plurality of slave nodes, which is located within a first threshold distance.

3. The method of claim 2, wherein the charging of the energy storage element comprises charging the energy storage element by using the tag search signal received from at least one of the plurality of slave nodes, which is located within a second threshold distance.

4. The method of claim 3, wherein the charging of the energy storage element comprises charging the energy storage element by using power of an auxiliary charging device located at a distance greater than the second threshold distance and less than the first threshold distance.

5. The method of claim 1, wherein the charging of the energy storage element comprises:
converting the received tag search signal into direct current energy,
providing the direct current energy to the energy storage element, and
charging a capacitor inside the energy storage element by using the provided direct current energy.

6. The method of claim 1,
wherein the received tag search signal is binary-modulated by using the identifying data,
wherein the obtaining of the identifying data further comprises demodulating the binary-modulated tag search signal, and
wherein the identifying data is obtained from the demodulated tag search signal.

7. The method of claim 1, wherein the tag search signal is an ultra wide bandwidth single pulse signal and is modulated in units of packets by using the identifying data.

8. The method of claim 7, wherein a number of tags identifiable by the plurality of slave nodes and the master node varies according to a length of each packet.

9. The method of claim 1,
wherein a frequency band of the tag search signal and a frequency band of the response signal are different from each other, and
wherein the charging of the energy storage element by the tag search signal and discharging of the energy storage element by the output of the response signal are performed independently in the frequency band of the tag search signal and the frequency band of the response signal.

10. The method of claim 9, wherein the charging of the energy storage element and discharging of the energy storage element are simultaneously performed as the energy storage element is charged to the certain numerical value or above.

11. A tag for transmitting a response signal regarding a tag search signal, the tag comprising:
an antenna receiving, from at least one of a plurality of slave nodes, the tag search signal including identifying data for identifying the tag, and outputting the response signal;
a harvester including an energy storage element and charging the energy storage element by using the received tag search signal; and
a controller configured to:
obtain the identifying data from the received tag search signal, determine whether the obtained identifying data matches identification information pre-stored in the tag, and
control the antenna to output the response signal when the energy storage element is charged to a certain numerical value or above and the obtained identifying data matches the identification information pre-stored in the tag,
wherein the tag search signal is broadcast from the plurality of slave nodes at a request of a master node.

12. The tag of claim 11,
wherein the antenna receives the tag search signal from at least one of the plurality of slave nodes, which is located within a first threshold distance, and
wherein the harvester charges the energy storage element by using the tag search signal received from at least one of the plurality of slave nodes, which is located within a second threshold distance.

13. The tag of claim 11,
wherein the received tag search signal is binary-modulated by using the identifying data, and
wherein the controller further comprises an identifying data obtainer configured to demodulate the binary-modulated tag search signal and obtain the identifying data from the demodulated tag search signal.

14. The tag of claim 11,
wherein a frequency band of the tag search signal and a frequency band of the response signal are different from each other, and
wherein the charging of the energy storage element by the tag search signal and discharging of the energy storage element by the output of the response signal are performed independently in the frequency band of the tag search signal and the frequency band of the response signal.

15. A non-transitory recording medium having recorded thereon a program for performing a method of transmitting a response signal, which, when executed by a processor of an electronic device, causes the processor to perform a method comprising:
receiving, from at least one of a plurality of slave nodes, a tag search signal including identifying data for identifying a tag;
charging an energy storage element inside the tag by using the received tag search signal;
obtaining the identifying data for identifying the tag from the received tag search signal;

determining whether the obtained identifying data matches identification information pre-stored in the tag; and when the energy storage element is charged to a certain numerical value or above and the obtained identifying data matches the identification information pre-stored in the tag, outputting the response signal regarding the tag search signal, wherein the tag search signal is broadcast from the plurality of slave nodes at a request of a master node.

\* \* \* \* \*